United States Patent
Shi

(10) Patent No.: US 8,494,521 B2
(45) Date of Patent: Jul. 23, 2013

(54) PROCESSING MULTI-REGISTRATION BACKUP DATA

(75) Inventor: Shufeng Shi, Xian (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/187,764

(22) Filed: Jul. 21, 2011

(65) Prior Publication Data

US 2011/0275372 A1 Nov. 10, 2011

Related U.S. Application Data

(63) Continuation of application No. PCT/CN2009/076139, filed on Dec. 28, 2009.

(30) Foreign Application Priority Data

Jan. 22, 2009 (CN) .......................... 2009 1 0077560

(51) Int. Cl.
*H04W 4/00* (2009.01)

(52) U.S. Cl.
USPC ............ 455/435.1; 455/432.3; 455/433; 455/435.2; 455/435.3

(58) Field of Classification Search
USPC .................. 455/432.3, 433, 435.1–435.3
See application file for complete search history.

(56) References Cited

U.S. PATENT DOCUMENTS

| 2004/0122934 A1 | 6/2004 | Westman et al. |
| 2006/0106774 A1* | 5/2006 | Cohen et al. .............. 707/3 |
| 2009/0210743 A1 | 8/2009 | Gu et al. |
| 2011/0213896 A1* | 9/2011 | Merino Vazquez et al. .. 709/245 |

FOREIGN PATENT DOCUMENTS

| CN | 101170553 | 4/2008 |
| CN | 101635963 | 1/2010 |
| EP | 1916821 A1 | 4/2008 |
| EP | 2009934 A1 | 12/2008 |
| WO | 2009/006942 A1 | 1/2009 |
| WO | 2010/049009 A1 | 5/2010 |

OTHER PUBLICATIONS

3GPP TS 29.228 V8.4.0, "3rd Generation Partnership Project; Technical Specification Group Core Network and Terminals; IP Multimedia (IM) Subsystem Cx and Dx interfaces; Signalling flows and message contents" Release 8, Dec. 2008, pp. 1-63.
3GPP TSG CT WG4, "Multiple Registrations in De-Registration", Change Request, Meeting #42, Feb. 2009, pp. 1-11.
3GPP TSG CT WG4, "Multiple Registrations in Registration", Change Request, Meeting #42, Feb. 2009, pp. 1-3.

(Continued)

*Primary Examiner* — Patrick N. Edouard
*Assistant Examiner* — Matthew Genack

(57) ABSTRACT

A method, an apparatus, and a system for processing registration backup data are disclosed. A Serving Call Session Control Function (S-CSCF) receives a request from a User Equipment (UE) and judges whether the request carries multi-registration information so as to decide whether to add multi-registration indication information into a Server Assignment Request (SAR) message sent to a Home Subscriber Server (HSS). The HSS performs operations according to whether the SAR message carries the multi-registration indication information, therefore avoiding unnecessary signaling interactions, reducing the signaling load, avoiding unnecessary data processing between the HSS and the S-CSCF, and saving system resources.

17 Claims, 8 Drawing Sheets

OTHER PUBLICATIONS

Extended European Search Report dated Apr. 16, 2012 issued in corresponding European Patent Application No. 09838682.4.
International Search Report, mailed Apr. 1, 2010, in International Application No. PCT/CN2009/076139 (4 pp.).
3rd Generation Partnership Project; Technical Specification Group Core Network and Terminals; IMS Restoration Procedures (Release 8), 3GPP TS 23.380 V8.1.0, Dec. 2008, pp. 1-11.
3rd Generation Partnership Project; Technical Specification Group Core Network and Terminals; Study on IMS Restoration Procedures (Release 8), 3GPP TR 23.820 V8.0.1, Dec. 2008, pp. 1-41.
3rd Generation Partnership Project; Technical Specification Group Core Network and Terminals; IP Multimedia (IM) Subsystem Cx and Dx interfaces; Signalling flows and message contents (Release 8), 3GPP TS 29.228 V8.4.0, Dec. 2008, pp. 1-63.
3rd Generation Partnership Project; Technical Specification Group Core Network and Terminals; Cx and Dx interfaces based on the Diameter protocol; Protocol details (Release 8), 3GPP TS 29.229 V8.4.0, Dec. 2008, pp. 1-35.
3rd Generation Partnership Project; Technical Specification Group Core Network and Terminals; IP multimedia call control protocol based on Session Initiation Protocol (SIP) and Session Description Protocol (SDP); Stage 3 (Release 8), 3GPP TS 24.229 V8.6.0, Dec. 2008, pp. 1-600.
3rd Generation Partnership Project; Technical Specification Group Core Network and Terminals; IMS Restoration Procedures (Release 8), 3GPP TS 23.380 V8.3.0, Jun. 2009, pp. 1-11.
Written Opinion of the International Searching Authority, mailed Apr. 1, 2010, in International Application No. PCT/CN2009/076139.
Office Action, mailed Jun. 29, 2011, in Chinese Application No. 200910077560.6.

* cited by examiner

PROCESSING MULTI-REGISTRATION BACKUP DATA

CROSS-REFERENCE TO RELATED APPLICATIONS

This application is a continuation of International Application No. PCT/CN2009/076139, filed on Dec. 28, 2009, which claims priority to Chinese Patent Application No. 200910077560.6, filed on Jan. 22, 2009, both of which are hereby incorporated by reference in their entireties.

FIELD OF THE INVENTION

The present invention relates to communications technologies, and in particular, to a method, an apparatus, and a system for processing registration backup data.

BACKGROUND OF THE INVENTION

The standardization organizations such as the $3^{rd}$ Generation Partnership Project (3GPP), 3GPP2, International Telecommunication Union Telecommunication Standardization Sector (ITU-T), Telecommunications and Internet converged Services and Protocols for Advanced Networking (TISPAN) are developing standards about the Next Generation Network (NGN), and have basically defined the IP Multimedia Subsystem (IMS) as a core network of the next-generation fixed and mobile networks. In the network evolution process, the access technologies and service provision are diversified, the bearer is Internet Protocol (IP)-based, and the core network is uniformly undertaken by the IMS.

Currently, the user identity for use in an IMS network may be an IP Multimedia Public User Identity (IMPU) or an IP Multimedia Private User Identity (IMPI). The user identity is stored in a Home Subscriber Server (HSS) in subscription mode. When the user performs a relevant service operation, a relevant entity such as an Interrogating Call Session Control Function (I-CSCF), a Serving Call Session Control Function (S-CSCF), and an Application Server (AS) in the network obtains the subscription data of the relevant user from the HSS by using the user identity.

In the IMS, the relation between one user identity and another, and the relation between the user identity and the subscription data are: One IMS subscription includes all subscription information of a subscriber that may be transmitted on a Cx interface; multiple IMPIs may exist under an IMS subscription, but one IMPI belongs to only one IMS subscription; one IMPI may include multiple IMPUs, and one IMPU may be shared by multiple IMPIs. That is, a one-to-many relation exists between the IMS subscription and the IMPI, and a many-to-many relation exists between the IMPI and the IMPU. A multi-registration concept is introduced in order for a user to use a subscription identity pair (IMPI, IMPU) through one User Equipment (UE) based on different access technologies. To put it simply, multi-registration enables a user to use a subscription identity pair (IMPI, IMPU) and register multiple contact addresses simultaneously. On every occasion of registering the UE, one of the contact addresses is registered. The UE adds a new "reg-id" parameter to the contact header field of the Session Initiation Protocol (SIP) REGISTER message to uniquely identify a registration in the multi-registration. When the UE registers a (IMPI, IMPU) pair with the S-CSCF simultaneously through multiple access technologies, the S-CSCF stores multiple registration records related to the (IMPI, IMPU) pair simultaneously. Each registration record has a different "reg-id". In the subsequent re-registration, the corresponding "reg-id" keeps unchanged. When the UE that supports multi-registration initiates deregistration, if all multi-registration addresses related to the (IMPI, IMPU) pair need to be deregistered, the UE needs to add "*" into the Contact header field; if one registration address in the multi-registration needs to be deregistered, the "Contact" header field needs to include the "reg-id" applied at the time of registering the UE.

To still provide a service for the user after the S-CSCF is restarted or faulty, the registration information of the user needs to be backed up in the HSS. After the S-CSCF is restarted or faulty and a new S-CSCF is selected, the user registration information can be obtained from the HSS so that the service is still available to the user. The HSS backs up the user registration information after receiving a Server Assignment Request (SAR) message that carries the user registration information from the S-CSCF. The S-CSCF obtains the user registration information by receiving a Server Assignment Answer (SAA) that carries the user registration information from the HSS. One (IMPI, IMPU) pair corresponds to a copy of registration backup data, and the registration backup data is stored in the HSS transparently.

Scenario 1: After receiving an initial registration request from the UE, the S-CSCF authenticates the UE successfully, and sends an SAR to the HSS to request the user profile. The SAR carries the registration information of the UE, including at least the contact address and information in a path header field. The HSS finds that the SAR is related to the initial registration (SAT=REGISTRATION) but the (IMPU, IMPI) pair has been registered, and the HSS stores the backup data related to the IMPI. Therefore, the HSS returns an SAA that carries the relevant registration backup data previously stored on the HSS to the S-CSCF, without using the registration backup data carried in the SAR to replace the stored backup data. According to the current registration information of the UE and the registration backup data returned by the HSS, the S-CSCF updates the registration backup data, for example, adds the contact address and path information related to this registration of the UE into the backup data, and sends an SAR (SAT=RE_REGISTRATION) message to the HSS again to update the backup data stored in the HSS.

The reason for the foregoing operations is that the registration backup data is stored in the HSS transparently, namely, the HSS does not parse the registration backup data in the SAR. After the S-CSCF is restarted or faulty and a new S-CSCF is selected, the S-CSCF stores no user data or the previous user data is not trustworthy. The foregoing operations are intended to prevent that: In a multi-registration scenario, after the S-CSCF receives a registration message from the UE such as a registration message for initial registration in the multi-registration, the SAR carries the registration backup data to the HSS, and such registration backup data replaces the registration backup data stored in the HSS in the previous registration (namely, another initial registration in the multi-registration), which leads to loss of some backup data and unavailability of the user registration backup data in the subsequent failover of the S-CSCF.

Scenario 2: The S-CSCF receives a deregistration message "REGISTER" from the UE. If the (IMPU, IMPI) pair related to the deregistration is not registered in the S-CSCF, the S-CSCF sends an SAR (SAT=NO_ASSIGNMENT) message to the HSS to request the relevant registration backup data. Afterward, the S-CSCF compares the contact address in the received backup data with the contact address carried in the deregistration message from the UE. If the two contact addresses are the same or the contact address from the UE carries "*", the S-CSCF sends a deregistration request SAR (SAT=USER_DEREGISTRATION) to the HSS to clear the registration backup data stored in the HSS. If the two contact addresses are different, the S-CSCF sends an SAR (SAT=RE_REGISTRATION) message that carries the updated user registration backup data to the HSS to update the user registration backup data in the HSS.

The foregoing operations are intended to prevent that: In a multi-registration scenario, after the S-CSCF is restarted or faulty and a new S-CSCF is selected, the S-CSCF receives a deregistration message from the UE. The deregistration message requests deregistration of a contact address in the multi-registration. If the S-CSCF sends a deregistration request SAR (SAT=USER_DEREGISTRATION) to the HSS directly, the HSS clears the stored registration backup data, which leads to loss of some backup data and unavailability of the user registration backup data related to the (IMPI, IMPU) pair in the subsequent failover of the S-CSCF.

In the process of implementing the present invention, the inventor finds at least the following problems in the prior art: The technical solution described in scenario 1 above recovers the multi-registration information without loss after the S-CSCF serving the user is faulty, but the S-CSCF and the HSS perform the SAR/SAA operation twice for all initial registrations. For the UE or S-CSCF that does not support multi-registration, in every conventional initial registration process of the UE, two SAR interactions still be performed between the HSS and the S-CSCF, which increases the unnecessary signaling load between the HSS and the S-CSCF and unnecessary data processing between the HSS and the S-CSCF. The solution provided in scenario 2 above can recover the registration backup data of multi-registration without loss after the S-CSCF is faulty and the registration backup data is cleared in the HSS in the case that the UE deregisters a contact address. The SAR/SAA interaction still is performed twice between the HSS and the S-CSCF because of multi-registration. Such interactions are unnecessary for the UE that does not support multi-registration. In conclusion, in the process of backing up the registration information in the prior art, the SAR/SAA signaling interaction is performed twice between the HSS and the S-CSCF due to multi-registration. For the UE or S-CSCF that does not support multi-registration, the unnecessary signaling load and unnecessary data processing between the HSS and the S-CSCF are increased, and therefore system resources are wasted seriously.

SUMMARY OF THE INVENTION

The embodiments of the present invention provide a method, an apparatus, and a system for processing registration backup data to overcome the disadvantages of the signaling load increase and system resource waste caused by multi-registration which requires SAR/SAA signaling to be exchanged twice between the HSS and the S-CSCF in the process of backing up registration information, and optimize the process of backing up the registration information.

An embodiment of the present invention provides a method for processing registration backup data. The method includes:

receiving a registration request message that carries at least a user identity from a UE; and sending an SAR message to an HSS according to whether the registration request message carries multi-registration information, where the SAR message carries the user identity and indication information which instructs the HSS to process stored registration backup data corresponding to the user identity.

An embodiment of the present invention provides a method for processing registration backup data. The method includes:

receiving an SAR message that is sent by an S-CSCF and carries at least a user identity; and parsing registration backup data in the SAR message, and updating stored registration backup data corresponding to the user identity according to a resolution result.

An embodiment of the present invention provides an S-CSCF. The S-CSCF includes:

a first receiving module, configured to receive a registration request message that carries at least a user identity from a UE; and a first processing module, configured to send an SAR message to an HSS according to whether the registration request message carries multi-registration information, where the SAR message carries the user identity and indication information which instructs the HSS to process stored registration backup data corresponding to the user identity.

An embodiment of the present invention provides an HSS. The HSS includes:

a second receiving module, configured to receive an SAR message that is sent by an S-CSCF and carries a user identity and indication information; and a third processing module, configured to process stored registration backup data corresponding to the user identity according to whether the indication information includes multi-registration indication information.

An embodiment of the present invention provides an HSS. The HSS includes:

a third receiving module, configured to receive an SAR message sent by an S-CSCF, where the SAR message carries at least a user identity; and a fifth processing module, configured to parse registration backup data in the SAR message, and update stored registration backup data corresponding to the user identity according to a resolution result.

An embodiment of the present invention provides an S-CSCF. The S-CSCF includes:

a second sending module, configured to send an SAR message to an HSS, where the SAR message carries a user identity and an Attribute Value Pair (AVP) that carries multi-registration information; and a sixth processing module, configured to receive updated registration backup data corresponding to the user identity, where the registration backup data is returned by the HSS according to the multi-registration information carried in the AVP.

An embodiment of the present invention provides a system for processing registration. The system includes:

an S-CSCF, configured to send an SAR message that carries a user identity to an HSS, and receive updated registration backup data corresponding to the user identity, where the updated registration backup data is returned by the HSS after the HSS parses the SAR message; and the HSS, configured to receive the SAR message sent by the S-CSCF, parse the SAR message, and update stored registration backup data corresponding to the user identity according to a resolution result.

In the method, apparatus, and system for processing registration backup data under the present invention, the S-CSCF judges whether the request of the UE carries multi-registration information, and decides whether to add multi-registration indication information into the SAR message sent to the HSS; the HSS performs operations according to whether the SAR message carries multi-registration indication information, therefore avoiding unnecessary signaling interactions and reducing the signaling load, avoiding unnecessary data processing between the HSS and the S-CSCF and therefore saving the system resources.

DETAILED DESCRIPTION OF THE EMBODIMENTS

Figure 1:
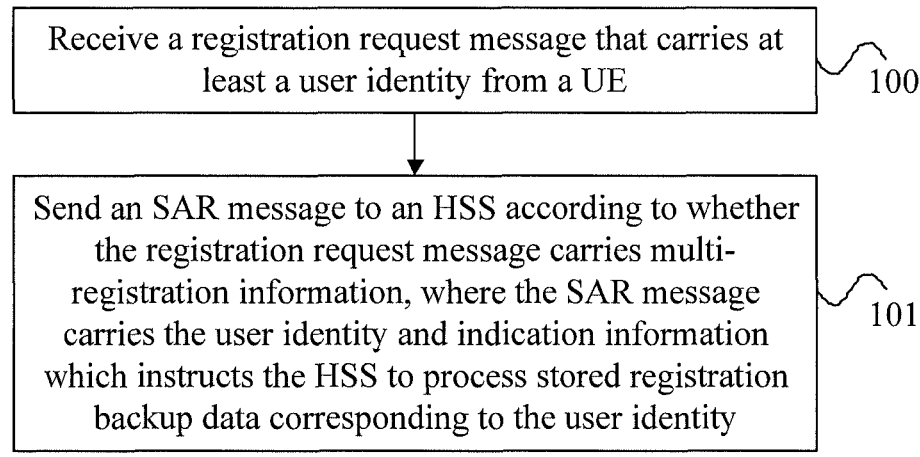
FIG. 1 is a flowchart of a method for processing registration backup data in a first embodiment of the present invention.

The technical solution under the present invention is described below with reference to the accompanying drawings and exemplary embodiments.

As a core network of the next-generation fixed and mobile networks, the IMS includes: a CSCF, an HSS, a Subscription Location Function (SLF), and an AS. The CSCF is a core control entity in the IMS network, and is responsible for registration authentication and session control for the UE. It performs basic session routing functions for the IMS users on the calling side and the called side, and triggers value-added service routing to the AS and performs service control interactions when conditions are fulfilled according to the IMS filtering rules subscribed to by a user. The HSS stores IMS subscription information set at the time when the user subscribes with the operator, and enables an operator or a terminal user to customize and modify subscription data through an interface to a service management system. The HSS registers the S-CSCF domain name route information in the IMS registration process through a Diameter-based Cx interface between the HSS and the S-CSCF. Through such an interface, the basic IMS subscription information can be downloaded to the S-CSCF. Through the Diameter-based Cx interface between the HSS and the I-CSCF, the HSS selects the S-CSCF for the user in the user registration process or tells the I-CSCF about the name of the S-CSCF currently serving the user so that the I-CSCF can route the registration message or session to a correct S-CSCF. The HSS provides a Diameter-based Sh interface between the HSS and the SIP AS, and provides a remote-database access interface of subscription data and service logic scripts for the value-added service SIP AS or Open Service Architecture (OSA) SCSF. The HSS is responsible for storing the AS value-added service data of the specific subscriber transparently, but does not parse the semantics of such data. The SLF has an address resolution mechanism. When the network operator has deployed multiple independent addressable HSSs, the mechanism enables the I-CSCF, S-CSCF, and AS to find the address of the HSS where the subscription data of a given user identity exists. The SLF may be integrated with the HSS physically. The AS obtains or updates the user service-related data and user state information through the Sh interface between the AS and the HSS, and the S-CSCF obtains the subscription information of the user through the Cx interface between the S-CSCF and the HSS. The service to be used by the user needs to be registered in the network first, and then a session connection is set up through the foregoing interfaces.

The UE can use various services provided by the IMS network after the UE is registered in the network. In addition, the UE may subscribe to unregistered services. The network can still provide unregistered services such as call forwarding and call recording for the user even if the UE is not registered in the network. When the UE is registered in the network or the user serves as a call terminating party, user authentication data and service data are exchanged between the S-CSCF and the HSS through SAR/SAA messages.

The application scenario of the SAR/SAA is as follows: After the S-CSCF receives a UE registration request from the P-CSCF or receives a session setup request (INVITE) message from the I-CSCF, (1) The S-CSCF initiates the following operations by sending an SAR command to the HSS:

assigning an S-CSCF to a public identity, or clearing the name of the S-CSCF assigned to one or more public identities;

requesting the downloading of user information, including user data or charging information;

changing the registration state of the relevant IMPU of the user; and backing up or updating registration information of the user corresponding to the IMPI.

The main application-layer parameters carried in the SAR message are shown in Table 1:

TABLE 1

| IE Name | Mapped Diameter AVP | Type | Description |
| --- | --- | --- | --- |
| Public User Identity/Public Service Identity | Public-Identity | C (mandatory when conditions are fulfilled) | The SAR message needs to carry only one of ore or more public identities in all operations except a deregistration operation. In a deregistration operation, the |

TABLE 1-continued

| IE Name | Mapped Diameter AVP | Type | Description |
|---|---|---|---|
| | | | SAR message needs to carry one public identity when no private identity exists. |
| S-CSCF Name | Server-Name | M (mandatory) | S-CSCF name. |
| Private User Identity/Private Service Identity | User-Name | C (mandatory when conditions are fulfilled) | This parameter indicates a private identity. This parameter needs to be carried when the S-CSCF is available. In a deregistration operation, the SAR message needs to carry the private identity when no public identity exists. |
| Server Assignment Type | Server-Assignment-Type | M (mandatory) | The S-CSCF requests the HSS to perform the type of operation indicated by this parameter. |
| User Data Already Available | User-Data-Already-Available | M (mandatory) | By using this parameter, the S-CSCF tells the HSS that the user data is available. |
| S-CSCF Restoration Information | SCSCF-Restoration-Info | C | This parameter indicates the registration backup data related to the IMPI in the request, and carries at least information in the path header field and a contact address. |

In the table above, the parameter "Server Assignment Type" has 11 values in total, and their meanings are as follows:

"NO_ASSIGNMENT(0)": The S-CSCF uses the parameter value to request user data from the HSS, without affecting a registration state of a user;

"REGISTRATION(1)": The parameter value is used for the initial registration of an identity;

"RE_REGISTRATION(2)": The parameter value is used for the re-registration of an identity;

"UNREGISTERED_USER(3)": The parameter value indicates that the S-CSCF receives an INVITE request directed to an unregistered user;

"TIMEOUT_DEREGISTRATION(4)": The parameter value is applicable when the deregistration is caused by timeout of a registration timer;

"USER_DEREGISTRATION(5)": The parameter value is applicable when the S-CSCF receives a deregistration request sent by the user;

"TIMEOUT_DEREGISTRATION_STORE_SERVER_NAME(6)": The parameter value is applicable when the deregistration is caused by timeout of the registration timer, and when the S-CSCF stores user data and requests the HSS to store the name of the S-CSCF;

"USER_DEREGISTRATION_STORE_SERVER_NAME(7)": The parameter value is applicable when the S-CSCF receives a deregistration request sent by the user, and when the S-CSCF stores user data and requests the HSS to store the name of the S-CSCF;

"ADMINISTRATIVE_DEREGISTRATION(8)": The parameter value is applicable when the S-CSCF performs the deregistration of an identity for a management reason;

"AUTHENTICATION_FAILURE(9)": The parameter value indicates failure of user authentication;

"AUTHENTICATION_TIMEOUT(10)": The parameter value indicates timeout of authentication; and "DEREGISTRATION_TOO_MUCH_DATA(11)": The parameter value is applicable when the S-CSCF requests user data from the HSS but receives too much data hardly acceptable to the S-CSCF.

When the name of the S-CSCF in the SAR message received by the HSS is different from the name of the S-CSCF stored in the HSS, the HSS does not replace the name of the S-CSCF stored in the HSS with the name of the S-CSCF in the SAR message received by the HSS, but returns "Experimental-Result-Code" whose value is "DIAMETER_ERROR_IDENTITY_ALREADY_REGISTERED", indicating that an S-CSCF has been assigned to the user.

If the operation type in the SAR message received by the HSS is an operation not allowed by the current state of the user, for example, if the value of "Server Assignment Type" in the message is "UNREGISTERED_USER", which indicates that the INVITE request received by the S-CSCF is directed to an unregistered IMPU but the IMPU in the HSS is registered, the HSS returns a message in which "Experimental-Result-Code" is "DIAMETER_ERROR_IN_ASSIGNMENT_TYPE", indicating that the S-CSCF has been assigned to the user and that the current state of the user does not allow such an operation.

(2) By using an SAA command, the HSS returns a processing result, user data, charging information, all IMPIs belonging to the "IMS subscription", all registered IMPIs that share the IMPU in the registration request, and the registration backup data of the user corresponding to the IMPI to the S-CSCF. The main application-layer parameters carried in an SAA message are shown in Table 2:

TABLE 2

| IE Name | Mapped Diameter AVP | Type | Description |
|---|---|---|---|
| Private User Identity/Private Service Identity | User-Name | C (mandatory when conditions are fulfilled) | Private identity. The parameter needs to be carried when the HSS is available. |

TABLE 2-continued

| IE Name | Mapped Diameter AVP | Type | Description |
|---|---|---|---|
| Registration result | Result-Code/ Experimental-Result | M (mandatory) | "Result-Code" indicates the returned value defined in the Diameter protocol, and "Experimental-Result" indicates the returned value newly defined on the Cx/Dx interface. |
| User Profile | User-Data | C (mandatory when conditions are fulfilled) | Requested user data. |
| Charging Information | Charging-Information | C (mandatory when conditions are fulfilled) | Address of a charging function, which needs to exist when "User-Data" exists. |
| Associated Private Identities | Associated-Identities | O (optional) | All IMPIs in the "IMS subscription" that includes the IMPI or IMPU. The AVP does not exist if the "IMS subscription" includes only one IMPI. |
| Associated Registered Private Identities | Associated-Registered-Identities | C (mandatory when conditions are fulfilled) | The AVP indicates all registered IMPIs that share the IMPU in the registration request. The AVP does not exist if only one IMPI has registered the relevant IMPU. |
| S-CSCF Restoration Information | SCSCF-Restoration-Info | C (mandatory when conditions are fulfilled) | The parameter indicates the registration backup data related to the IMPI in the request, and carries at least information in the path header field and a contact address. |

The HSS downloads user data and an address of a charging function only if the operation type is "NO_ASSIGNMENT, REGISTRATION, RE_REGISTRATION, UNREGISTERED_USER"; backs up registration information only if the operation type is "REGISTRATION" and "RE_REGISTRATION"; and downloads registration backup data only if the operation type is "UNREGISTERED_USER" and "NO_ASSIGNMENT". One (IMPI, IMPU) pair corresponds to a copy of the registration backup data, and the registration backup data is stored in the HSS transparently.

FIG. 1 is a flowchart of a method for processing registration backup data in the first embodiment of the present invention. As shown in FIG. 1, the method includes the following steps:

Step 100: Receive a registration request message that carries at least a user identity from a UE.

When the UE requests the network to perform a certain operation such as deregistration or initial registration, the UE sends a registration request message to the I-CSCF through a Proxy Call Session Control Function (P-CSCF). The I-CSCF obtains the S-CSCF name assigned to the user through the HSS, or selects an S-CSCF for the user according to the S-CSCF capability set returned by the HSS, and then sends a registration request message (REGISTER) received from the UE to the S-CSCF. The REGISTER message carries the user identity (IMPI, IMPU) registered by the UE.

Step 101: Send an SAR message to an HSS according to whether the registration request message carries multi-registration information, where the SAR message carries the user identity and indication information which instructs the HSS to process stored registration backup data corresponding to the user identity.

After receiving the REGISTER message sent by the UE, the S-CSCF judges whether the message carries multi-registration information (namely, a "reg-id" parameter), and thereby knows whether the message is an ordinary initial registration request or an initial registration request in multi-registration. The S-CSCF sends an SAR message to the HSS according to whether the message carries a "reg-id" parameter. The SAR message carries the registered identity information (IMPI, IMPU) of the UE and the indication information which instructs the HSS to process the stored registration backup data corresponding to the (IMPI, IMPU). The "reg-id" parameter may be stored in the contact header field of the REGISTER message.

The S-CSCF determines the SAR message sent to the HSS according to whether the "reg-id" parameter is carried in the registration request message, as detailed below:

Scenario 1: The S-CSCF determines that the REGISTER message carries a "reg-id" parameter, which indicates that the message is a request for initial registration in multi-registration. Therefore, the S-CSCF sends a first SAR message to the HSS. The first SAR message carries the user identity (IMPI, IMPU) registered by the UE and the indication information which instructs the HSS to process the stored registration backup data corresponding to the user identity. The indication information includes server assignment type information indicating that the SAR message is a request for performing initial registration of the user identity, and includes multi-registration indication information. The server assignment type information is "Server Assignment Type" (whose value is "REGISTRATION" in the SAR message. The S-CSCF generates multi-registration indication information according to the "reg-id" parameter in the REGISTER message. The multi-registration indication information is carried in the SAR message and sent to the HSS. The HSS knows that the SAR message is a request about multi-registration according to the multi-registration indication so that the HSS can perform corresponding operations.

In the foregoing scenario, the S-CSCF may generate a corresponding SAR message and send it to the HSS according to whether the REGISTER message carries a "reg-id" parameter. After knowing that the REGISTER message carries a "reg-id" parameter, the S-CSCF may judge whether the S-CSCF itself stores the registration information corresponding to the user identity (IMPI, IMPU) carried in the REGISTER message. If the S-CSCF itself does not store the registration information, the S-CSCF sends a first SAR message to the HSS. The first SAR message carries SAT=REGISTRATION and multi-registration indication information. If the S-CSCF stores no registration information related to the user identity, a possible reason is that the network selects a new S-CSCF for serving the user after the old S-CSCF fails, resulting in lack of registration information. To prevent the HSS from updating the registration backup data on the HSS directly according to the SAR message sent by the S-CSCF and such update causes data loss, an SAR/SAA signaling interaction needs to be performed twice. Through the first interaction, the S-CSCF requests the stored registration backup data from the HSS; through the second interaction, the S-CSCF sends the updated registration backup data to the HSS, therefore ensuring integrity of the registration backup data related to the user identity and providing better services for the user.

If the REGISTER message carries a "reg-id" parameter but it is determined that the S-CSCF itself stores the registration information corresponding to the user identity (IMPI, IMPU), the S-CSCF sends a second SAR message to the HSS. The second SAR message carries a user identity (IMPI, IMPU) and indication information. The indication information includes only the server assignment type information which indicates that the SAR message is a request for initial registration of the user identity, namely, includes only the parameter "SAT=REGISTRATION" rather than multi-registration indication information. In this scenario, the S-CSCF receives the REGISTER message that carries a "reg-id" parameter, and determines that the S-CSCF itself stores the registration information corresponding to the (IMPI, IMPU) pair carried in the REGISTER message. In this case, the S-CSCF may construct complete registration backup data directly by using the registration information stored locally and the registration information in the REGISTER message. For example, the contact address and the path information related to the current registration of the UE are added into the old registration information to form registration backup data, and the registration backup data is sent to the HSS through a second SAR message. After receiving the SAR message, the HSS directly updates the registration backup data stored in the HSS according to the parameter in the SAR message, therefore avoiding the second SAR/SAA signaling interaction and saving system resources. The step of judging whether the REGISTER message carries a "reg-id" parameter may be performed after the step of judging whether the S-CSCF itself stores the registration information corresponding to the user identity (IMPI, IMPU) carried in the REGISTER message. After the S-CSCF determines that the S-CSCF stores the registration information corresponding to the user identity, it is even unnecessary to judge whether the message carries a "reg-id" parameter or other relevant multi-registration information. The S-CSCF may judge whether the S-CSCF itself stores the registration information corresponding to the user identity after judging the "reg-id" parameter.

In scenario 1, the operation order of the S-CSCF may be: generating multi-registration indication information according to the "reg-id" parameter in the REGISTER message directly; or, determining that the REGISTER message carries a "reg-id" parameter first, determining that the S-CSCF itself stores no registration information, and then generating multi-registration indication information; or, determining that the S-CSCF itself stores no registration information corresponding to the user identity first, determining that the REGISTER message carries the "reg-id" parameter, and then generating multi-registration indication information. Regardless of the operation order of the S-CSCF, after the HSS receives the first SAR message from the S-CSCF, if the HSS determines that the first SAR message carries multi-registration indication information, and that the user identity (IMPI, IMPU) carried in the first SAR message is registered in the HSS and that the HSS stores the relevant registration backup data, the HSS returns the stored registration backup data to the S-CSCF according to the indication, where the registration backup data corresponds to the user identity (IMPI, IMPU) registered by the UE and may be carried in an SAA message which is sent in response to the first SAR message. The SAA message may carry a re-backup indication which instructs the S-CSCF to update the registration backup data. After receiving the SAA message that carries the registration backup data and the re-backup indication, the S-CSCF uses the registration information in the REGISTER message to update the registration backup data returned by the HSS according to the re-backup indication, and sends the updated registration backup data to the HSS. For the re-backup indication, the "Experimental-Result AVP" in the SAA message sent by the HSS may carry an error code "DIAMETER_ERROR_IN_ASSIGNMENT_TYPE" or another error code to indicate the re-backup, or a new AVP is added in the SAA message to carry the relevant indication information. In the foregoing embodiment, the S-CSCF updates the registration backup data in the SAA message according to the re-backup indication carried in the SAA message. Alternatively, the S-CSCF receives the SAA message returned by the HSS according to the first SAR message, where the SAA message carries the registration backup data corresponding to the user identity but carries no indication. The S-CSCF compares the registration backup data in the SAA message with the registration information in the REGISTER message. If the registration information in the REGISTER message is different from the registration backup data returned by the HSS, the S-CSCF uses the registration information in the REGISTER message to update the registration backup data returned by the HSS, and sends the updated registration backup data to the HSS. If the registration information in the REGISTER message is the same as the registration backup data returned by the HSS, the S-CSCF sends no SAR message to the HSS, therefore avoiding unnecessary signaling interactions, reducing the signaling load, avoiding unnecessary data processing between the HSS and the S-CSCF, and saving system resources.

Scenario 2: The S-CSCF determines that the REGISTER message carries no "reg-id" parameter, and sends a third SAR message to the HSS. The third SAR message carries the user identity (IMPI, IMPU) and indication information. The indication information includes server assignment type information indicating that the third SAR message is a request for initial registration of the user identity. In this case, the S-CSCF determines that the REGISTER message carries no "reg-id" parameter or any other multi-registration information, and knows that the third SAR message involves no multi-registration and is only an ordinary registration request. Because the third SAR message sent by the S-CSCF to the HSS carries no multi-registration indication information, the third SAR message is unrelated to multi-registration. Therefore, after receiving the third SAR message, the HSS may store the registration backup data in the third SAR message as the registration backup data corresponding to the registered user identity (IMPI, IMPU) directly. If the HSS already stores the registration backup data related to the user identity, the HSS may replace the stored registration backup data with the registration backup data carried in the SAR, therefore avoiding an unnecessary second SAR/SAA signaling interaction, reducing the signaling load, avoiding unnecessary data processing between the HSS and the S-CSCF, and saving system resources.

Scenario 3: The S-CSCF determines that the REGISTER message carries not only the "reg-id" parameter, but also deregistration information such as a parameter "expires=0", and determines that the S-CSCF itself stores the registration information corresponding to the user identity (IMPI, IMPU). According to the parameters in the REGISTER message, the S-CSCF knows that this message is a request for deregistering the user identity (IMPI, IMPU), and that the S-CSCF stores the registration information related to the user identity. Therefore, the S-CSCF compares whether stored registration information is the same as the registration information in the registration request message. If the stored registration information is different from the registration information in the registration request message, for example, if the stored registration information includes any "reg-id" other than the "reg-id" carried in the REGISTER message and the corresponding registration information, or if the stored registration information includes any contact address other than the contact address carried in the REGISTER message, the S-CSCF uses the registration information in the REGISTER message and the stored registration information to construct registration backup data. For example, the S-CSCF deletes the contact address deregistered on this occasion and the relevant path information from the old registration information to form registration backup data, and sends the registration backup data to the HSS through a seventh SAR message (SAT=RE_REGISTRATION). After receiving the SAR message, the HSS updates the registration backup data stored in the HSS directly according to the parameter in the SAR message, therefore avoiding the second SAR/SAA signaling interaction and saving the system resources. If the stored registration information is the same as the registration information in the registration request message, the S-CSCF sends a fourth SAR message to the HSS. The fourth SAR message carries a user identity (IMPI, IMPU) and indication information. The indication information includes the server assignment type information which instructs the HSS to deregister the user identity. For example, the server assignment type information is "SAT=SAT=USER_DEREGISTRATION". After receiving the fourth SAR message, the HSS can deregister the user identity directly according to the indication, and delete the registration backup data related to the user identity.

The S-CSCF determines that the REGISTER message carries not only the "reg-id" parameter, but also deregistration information such as a parameter "expires=0", and determines that the S-CSCF itself stores no registration information corresponding to the user identity (IMPI, IMPU). Therefore, the S-CSCF sends a sixth SAR message to the HSS. The sixth SAR message carries the user identity (IMPI, IMPU) and indication information. The indication information includes server assignment type information (such as SAT=NO_ASSIGNMENT) which requests the registration backup data corresponding to the user identity from the HSS. The HSS returns the required registration backup data corresponding to the user identity to the S-CSCF according to the "SAT=NO_ASSIGNMENT" if the HSS stores the registration backup data related to the user identity. The S-CSCF receives the SAA message returned by the HSS according to the sixth SAR message. The SAA message carries the registration backup data. Afterward, the S-CSCF compares whether received registration backup data is the same as the registration information in the REGISTER message. If the received registration backup data is different from the registration information in the REGISTER message, for example, if the stored registration information includes any "reg-id" other than the "reg-id" carried in the REGISTER message and the corresponding registration information, or if the registration backup data includes any contact address other than the contact address carried in the REGISTER message, the S-CSCF uses the registration information in the REGISTER message to update the received registration backup data, and sends the updated registration backup data to the HSS for backup through an eighth SAR message (SAT=RE_REGISTRATION). If the received registration backup data is the same as the registration information in the REGISTER message, the S-CSCF sends a ninth SAR message to the HSS. The ninth SAR message carries the user identity (IMPI, IMPU) and indication information. The indication information includes server assignment type information (such as SAT=USER_DEREGISTRATION) which instructs the HSS to deregister the user identity.

Scenario 4: The S-CSCF determines that the REGISTER message carries the deregistration information such as a parameter "expires=0" but carries no "reg-id" parameter, and sends a fifth SAR message to the HSS. The fifth SAR message carries the user identity (IMPI, IMPU) and indication information. The indication information includes server assignment type information (such as SAT=USER_DEREGISTRATION) which instructs the HSS to deregister the user identity. In this case, the S-CSCF determines that the REGISTER message carries no "reg-id" parameter, and then knows that the deregistration request involves no multi-registration. Therefore, the S-CSCF can send a deregistration indication to the HSS directly without caring about loss of the registration backup data, therefore avoiding an unnecessary second SAR/SAA signaling interaction, reducing the signaling load, avoiding unnecessary data processing between the HSS and the S-CSCF, and saving system resources.

In the foregoing embodiment, the judging order does not matter when the S-CSCF judges whether the S-CSCF itself stores the registration information corresponding to the user identity (IMPI, IMPU), whether the REGISTER message carries the "reg-id" parameter, and whether the message is a registration message or a deregistration message. For example, the S-CSCF may judge whether the S-CSCF itself stores the registration information corresponding to the user identity before or after judging whether the REGISTER message carries the "reg-id" parameter.

In the foregoing embodiment, the S-CSCF adds a multi-registration indication in the SAR message in the initial registration process of the UE. The HSS does not replace the stored registration backup data only if the HSS receives an SAR message that carries a multi-registration indication. If the SAR message carries no multi-registration indication, the HSS uses the registration backup data in the SAR message to replace the old data, therefore reducing unnecessary signaling interactions between the S-CSCF and the HSS in the conventional initial registration process of the UE or S-CSCF that does not support multi-registration. In the case of deregistration, before sending an SAR message to the HSS to request the registration backup data, the S-CSCF judges whether the received deregistration message "REGISTER" is sent by a UE that supports multi-registration, and whether the deregistration message intends to deregister only a contact address in the multi-registration, namely, whether the contact header field includes a "reg-id"; if so, the S-CSCF sends an SAR message to the HSS to request the registration backup data; if not, the S-CSCF sends a deregistration request SAR directly to clear the relevant registration backup data stored in the HSS, therefore reducing the unnecessary signaling interactions between the S-CSCF and the HSS in the deregistration process of the UE or S-CSCF that does not support multi-registration.

Figure 2:
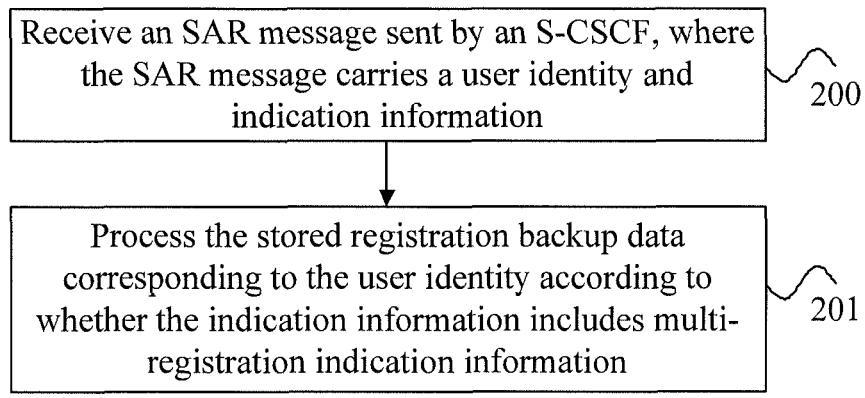
FIG. 2 is a flowchart of a method for processing registration backup data in a second embodiment of the present invention.

FIG. 2 is a flowchart of a method for processing registration backup data in the second embodiment of the present invention. As shown in FIG. 2, the method includes the following steps:

Step 200: Receive an SAR message sent by an S-CSCF, where the SAR message carries a user identity and indication information from an S-CSCF.

When the UE requests the network to perform a certain operation such as initial registration or deregistration, the UE sends a REGISTER message to the P-CSCF or I-CSCF; the I-CSCF obtains a corresponding S-CSCF name through the HSS and then sends a REGISTER message of the UE to the S-CSCF. The REGISTER message carries the user identity (IMPI, IMPU) registered by the UE. After receiving the REGISTER message sent by the UE, the S-CSCF judges whether the message carries multi-registration information (namely, a "reg-id" parameter), and sends an SAR message to the HSS according to a judgment result. The SAR message carries the identity information (IMPI, IMPU) registered by the UE and indication information which instructs the HSS to process the stored registration backup data corresponding to the (IMPI, IMPU). The HSS receives the SAR message sent by the S-CSCF. The "reg-id" parameter may be stored in the contact header field of the REGISTER message.

If the S-CSCF determines that the REGISTER message carries a "reg-id" parameter, the S-CSCF adds multi-registration indication information into the SAR message; or, if the S-CSCF determines that the REGISTER message carries a "reg-id" parameter and the S-CSCF itself stores no registration information corresponding to the user identity (IMPI, IMPU), the S-CSCF adds multi-registration indication information into the SAR message. If the REGISTER message carries a "reg-id" parameter but the S-CSCF determines that the S-CSCF itself stores the registration information corresponding to the user identity (IMPI, IMPU), the S-CSCF adds no multi-registration indication information into the SAR message. If the S-CSCF determines that the REGISTER message carries no "reg-id" parameter, the S-CSCF adds no multi-registration indication information into the SAR message. If the S-CSCF determines that the REGISTER message carries not only the "reg-id" parameter, but also deregistration information such as a parameter "expires=0", and determines that the S-CSCF itself stores the registration information corresponding to the user identity (IMPI, IMPU), the S-CSCF compares the registration information stored in the S-CSCF with the registration information in the registration request message. If the stored registration information is different from the registration information in the registration request message, for example, if the stored registration information includes any "reg-id" other than the "reg-id" carried in the REGISTER message and the corresponding registration information, or if the stored registration information includes any contact address other than the contact address carried in the REGISTER message, the S-CSCF uses the registration information in the REGISTER message and the stored registration information to construct registration backup data. For example, the S-CSCF deletes the contact address deregistered on this occasion and the relevant path information from the old registration information to form registration backup data, and sends the registration backup data to the HSS through an SAR message (SAT=RE_REGISTRATION). After receiving the SAR message, the HSS updates the registration backup data stored in the HSS directly according to the parameter in the SAR message. If the stored registration information is the same as the registration information in the registration request message, the S-CSCF sends an SAR message to the HSS, and the SAR message is an instruction of deregistering the user identity. For example, the server assignment type information is "SAT=SAT=USER_DEREGISTRATION". After receiving the SAR message, the HSS can deregister the user identity directly according to the instruction, and delete the stored registration backup data related to the user identity. If the S-CSCF determines that the REGISTER message carries not only the "reg-id" parameter, but also deregistration information such as a parameter "expires=0", and determines that the S-CSCF itself stores no registration information corresponding to the user identity (IMPI, IMPU), the S-CSCF sends an SAR message which instructs the HSS to return the stored registration backup data of the UE and the SAR message carries no multi-registration indication information. If the S-CSCF determines that the REGISTER message carries deregistration information such as a parameter "expires=0" but carries no "reg-id" parameter, the S-CSCF sends an SAR message which instructs the HSS to perform deregistration, and the SAR message carries no multi-registration indication information.

Step 201: Process the stored registration backup data corresponding to the user identity according to whether the indication information includes multi-registration indication information.

The HSS performs operations according to the indication information in the received SAR message, and processes the stored registration backup data corresponding to the user identity (IMPI, IMPU) in the following way:

If the indication information includes server assignment type information indicating that the SAR message is a request for performing initial registration of the user identity, and includes multi-registration indication information, the HSS returns an SAA message to the S-CSCF. The SAA message carries the stored registration backup data corresponding to the user identity. Alternatively, the SAA message may carry a re-backup indication such as a "DIAMETER_ERROR_IN_ASSIGNMENT_TYPE" failure indication which instructs the S-CSCF to update the registration backup data, or carry another indication which instructs the S-CSCF to back up the registration information again. Afterward, the S-CSCF sends a second SAR message to the HSS. The HSS receives and stores the registration backup data which is updated by the S-CSCF by using the registration information in the registration request message sent by the UE.

If the indication information includes server assignment type information indicating that the SAR message is a request for performing initial registration of the user identity, it indicates that the S-CSCF has updated the stored registration backup data corresponding to the user identity (IMPI, IMPU). Therefore, the registration backup data carried in the SAR message can be used directly to update the data stored on the HSS without the unnecessary second signaling interaction.

If the indication information includes server assignment type information which is an instruction of deregistering the user identity, it indicates that the S-CSCF has received a deregistration request from the UE, and the S-CSCF determines that it is appropriate to instruct the HSS to perform deregistration directly without checking the UE registration backup data stored on the HSS. After receiving the deregistration SAR message that carries no multi-registration indication information, the HSS may delete the stored registration backup data, therefore avoiding an unnecessary second signaling interaction.

If the indication information includes server assignment type information which requests the registration backup data corresponding to the user identity, it indicates that the S-CSCF stores no corresponding registration backup data in the process of the registration or deregistration related to multi-registration. To prevent data loss caused by replacement of all data stored on the HSS, the S-CSCF requests the HSS to return all registration backup data corresponding to the (IMPI, IMPU) first. The HSS returns an SAA message to the S-CSCF. The SAA message carries the stored registration backup data corresponding to the user identity (IMPI, IMPU). The S-CSCF updates the registration backup data according to the registration information in the registration request message, and returns the updated registration backup data to the HSS. The HSS receives and stores the registration backup data which is updated by the S-CSCF by using the registration information in the registration request message sent by the UE.

In the method for processing registration backup data in this embodiment, the HSS is improved so that the HSS can process the stored registration backup data according to whether the SAR message carries the multi-registration indication information, therefore avoiding an unnecessary second signaling interaction and reducing the signaling load, avoiding unnecessary data processing between the HSS and the S-CSCF and saving the system resources.

Figure 3:
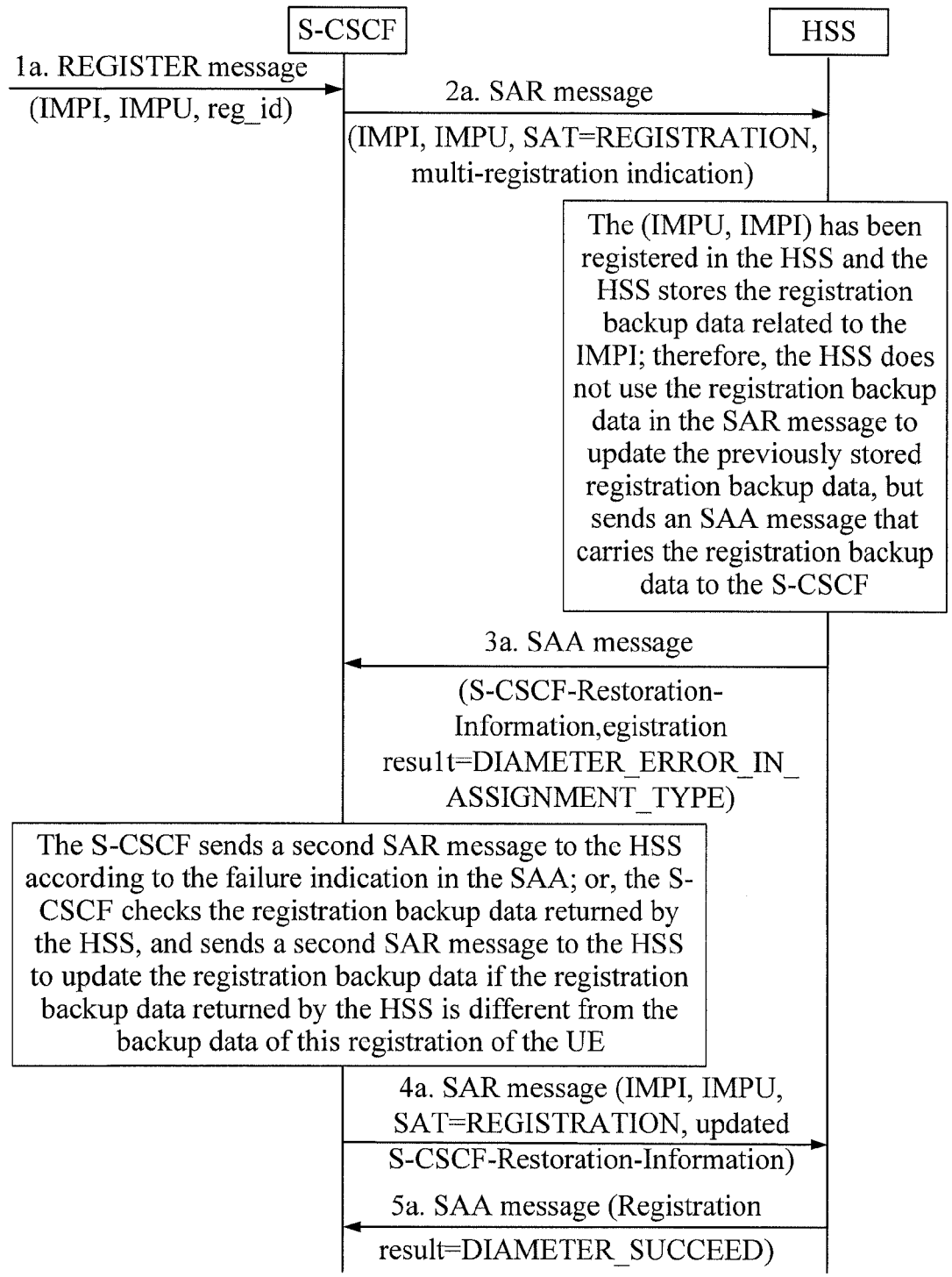
FIG. 3 is a signaling diagram of a method for processing registration backup data in a third embodiment of the present invention.

FIG. 3 is a signaling diagram of a method for processing registration backup data in the third embodiment of the present invention. As shown in FIG. 3, the procedure for backing up and/or recovering the registration information after the S-CSCF receives an initial registration request sent by the UE includes the following steps:

Step 1a: The S-CSCF receives an initial registration message "REGISTER" from the UE, and the message carries the (IMPU, IMPI) to be registered. The contact header field includes a contact address and further includes at least "reg-id" information.

Step 2a: According to the "reg-id" in the contact header field in the REGISTER message, the S-CSCF determines that the UE supports multi-registration. Therefore, the SAR message sent to the HSS for requesting the user service configuration data carries a multi-registration indication.

Note: A new AVP may be added in the SAR message to carry the multi-registration indication, or an existing AVP is extended to carry the multi-registration indication (for example, a value range is extended).

Step 3a: Through the multi-registration indication and "RAT=REGISTRATION", the HSS determines that the SAR message is generated in an initial registration process of multi-registration, and that the (IMPU, IMPI) in the SAR message has been registered in the HSS, and that the HSS stores the registration backup data related to the IMPI. Therefore, the HSS returns an SAA message that carries the previously stored registration backup data to the S-CSCF, without using the registration backup data carried in the SAR message to update the previously stored registration backup data. Optionally, the HSS returns an SAA message that carries a re-backup indication such as a "DIAMETER_ERROR_IN_ASSIGNMENT_TYPE" failure indication or carries another indication which instructs the S-CSCF to back up the registration information again.

Step 4a: The S-CSCF sends a second SAR (SAT=RE_REGISTRATION) to the HSS to back up the registration data according to the failure indication in the SAA message or the another indication that instructs the S-CSCF to back up the registration information again. The registration data for backup is the complete registration backup data which has been updated according to the registration backup data returned by the HSS and the backup data of this registration of the UE.

The S-CSCF checks the registration backup data returned by the HSS. The S-CSCF sends a second SAR message to the HSS to update the registration backup data only if the registration backup data returned by the HSS is different from the backup data of this registration of the UE.

Step 5a: The HSS returns an SAA message to the S-CSCF.

Figure 4:
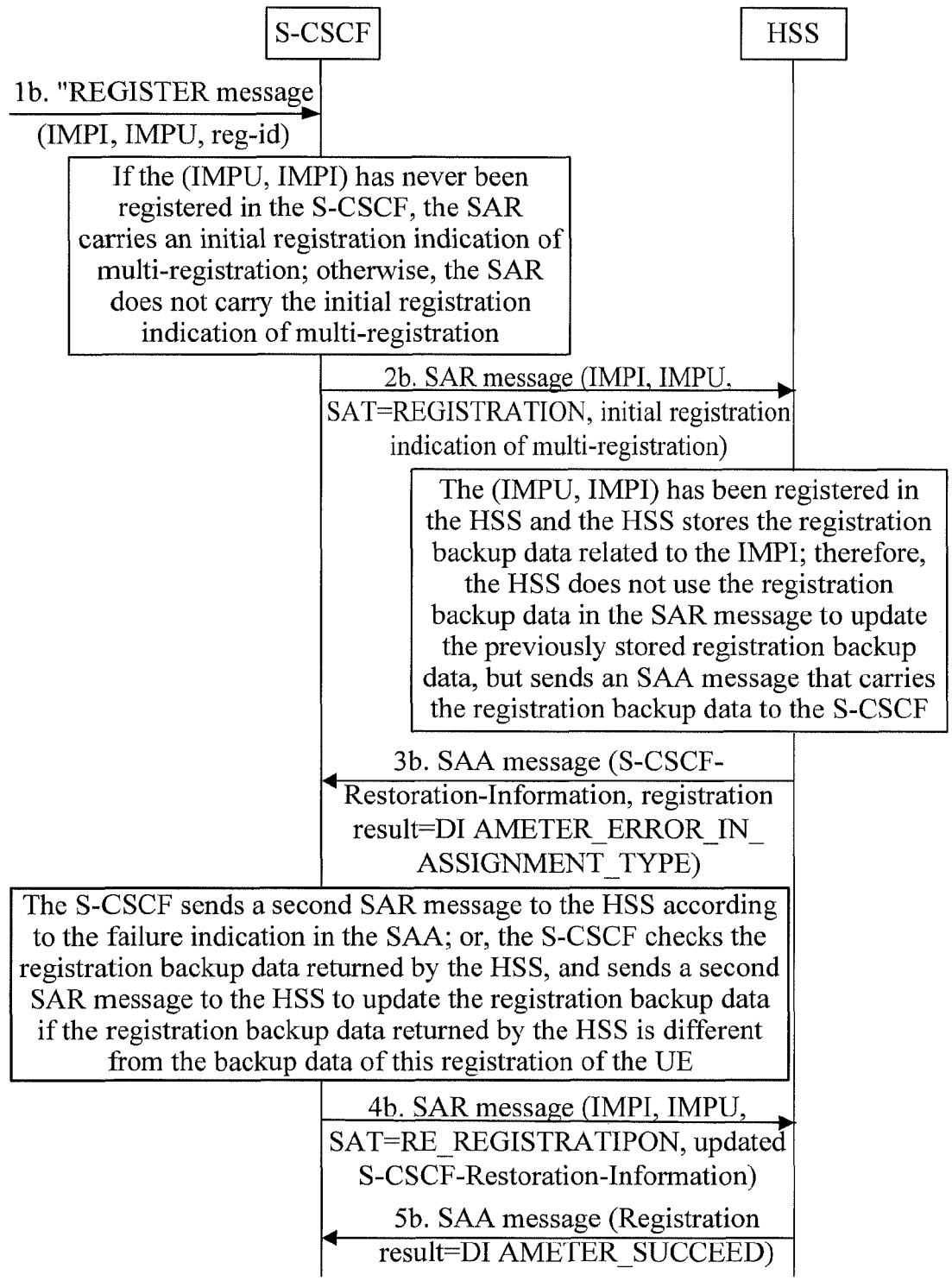
FIG. 4 is a signaling diagram of a method for processing registration backup data in a fourth embodiment of the present invention.

FIG. 4 is a signaling diagram of a method for processing registration backup data in the fourth embodiment of the present invention. As shown in FIG. 4, the procedure for backing up and/or recovering the registration information after the S-CSCF receives an initial registration request sent by the UE includes the following steps:

Step 1b: The S-CSCF receives an initial registration message "REGISTER" from the UE, and the message carries the (IMPU, IMPI) to be registered. The contact header field includes a contact address and further includes at least "reg-id" information.

Step 2b: The S-CSCF finds that the (IMPI, IMPU) has never been registered in the S-CSCF before, namely, no relevant (IMPI, IMPU) registration information exists. According to the "reg-id" in the contact header field in the REGISTER message, the S-CSCF determines that the UE supports multi-registration. Therefore, the SAR message carries an initial registration indication of multi-registration.

Note: A new AVP may be added in the SAR message to carry the initial registration indication of multi-registration, or an existing AVP is extended to carry the indication (for example, a value range is extended).

Step 3b: Through the initial registration indication of multi-registration and "SAT=REGISTRATION", the HSS determines that the SAR message is generated in an initial registration process of multi-registration, and that the (IMPU, IMPI) in the SAR message has been registered in the HSS, and that the HSS stores the registration backup data related to the IMPI. Therefore, the HSS returns an SAA message that carries the previously stored registration backup data to the S-CSCF, without using the registration backup data carried in the SAR message to update the previously stored registration backup data. Optionally, the HSS returns an SAA message that carries a "DIAMETER_ERROR_IN_ASSIGNMENT_TYPE" failure indication or carries another indication which instructs the S-CSCF to back up the registration information again.

Step 4b: The S-CSCF sends a second SAR (SAT=RE_REGISTRATION) to the HSS to back up the registration data according to the failure indication in the SAA message or the other indication that instructs the S-CSCF to back up the registration information again. The registration data for backup is the complete registration backup data which has been updated according to the registration backup data returned by the HSS and the backup data of this registration of the UE.

The S-CSCF checks the registration backup data returned by the HSS. The S-CSCF sends a second SAR message to the HSS to update the registration backup data only if the registration backup data returned by the HSS is different from the backup data of this registration of the UE.

Step 5b: The HSS returns an SAA message to the S-CSCF.

In the methods for processing registration backup data in the embodiments above, the S-CSCF receives an initial registration request sent by the UE and determines that the UE supports multi-registration according to the "reg-id" in the contact header field in the REGISTER message. The SAR message sent to the HSS for requesting the user service configuration data carries a multi-registration indication. Alternatively, the S-CSCF finds that the UE has never been registered in the S-CSCF before, namely, no relevant registration information exists, and determines that the UE supports multi-registration according to the "reg-id". The SAR message carries an initial registration indication of multi-registration. Through the multi-registration indication or the initial registration indication of multi-registration, the HSS determines that the SAR message is generated in an initial registration process of multi-registration, and that the (IMPU, IMPI) in the SAR message has been registered in the HSS, and that the HSS stores the registration backup data. Therefore, the HSS returns an SAA message that carries the previously stored registration backup data to the S-CSCF, without using the registration backup data carried in the SAR message to update the previously stored registration backup data. The S-CSCF sends a second SAR message to the HSS to back up the registration data according to the failure indication in the SAA message. The registration data for backup is the complete registration backup data which has been updated according to the registration backup data returned by the HSS and the backup data of this registration of the UE. Alternatively, the S-CSCF checks the registration backup data returned by the HSS. The S-CSCF sends a second SAR message to the HSS to update the registration backup data only if the registration backup data returned by the HSS is different from the backup data of this registration of the UE. In the solution described above, the HSS exchanges SAR/SAA messages with the S-CSCF twice only if the SAR message sent by the S-CSCF carries an initial registration indication of multi-registration. That is because: In the initial registration (including single registration and multi-registration) process initiated by the UE for the first time, the S-CSCF which is restarted due to exceptions or the reselected S-CSCF interacts with the HSS to recover all backup data related to the UE completely, the backup data is stored in the HSS completely. It is not necessary to perform the SAR/SAA interaction twice between the HSS and the S-CSCF in the subsequent multi-registration process.

Figure 5:
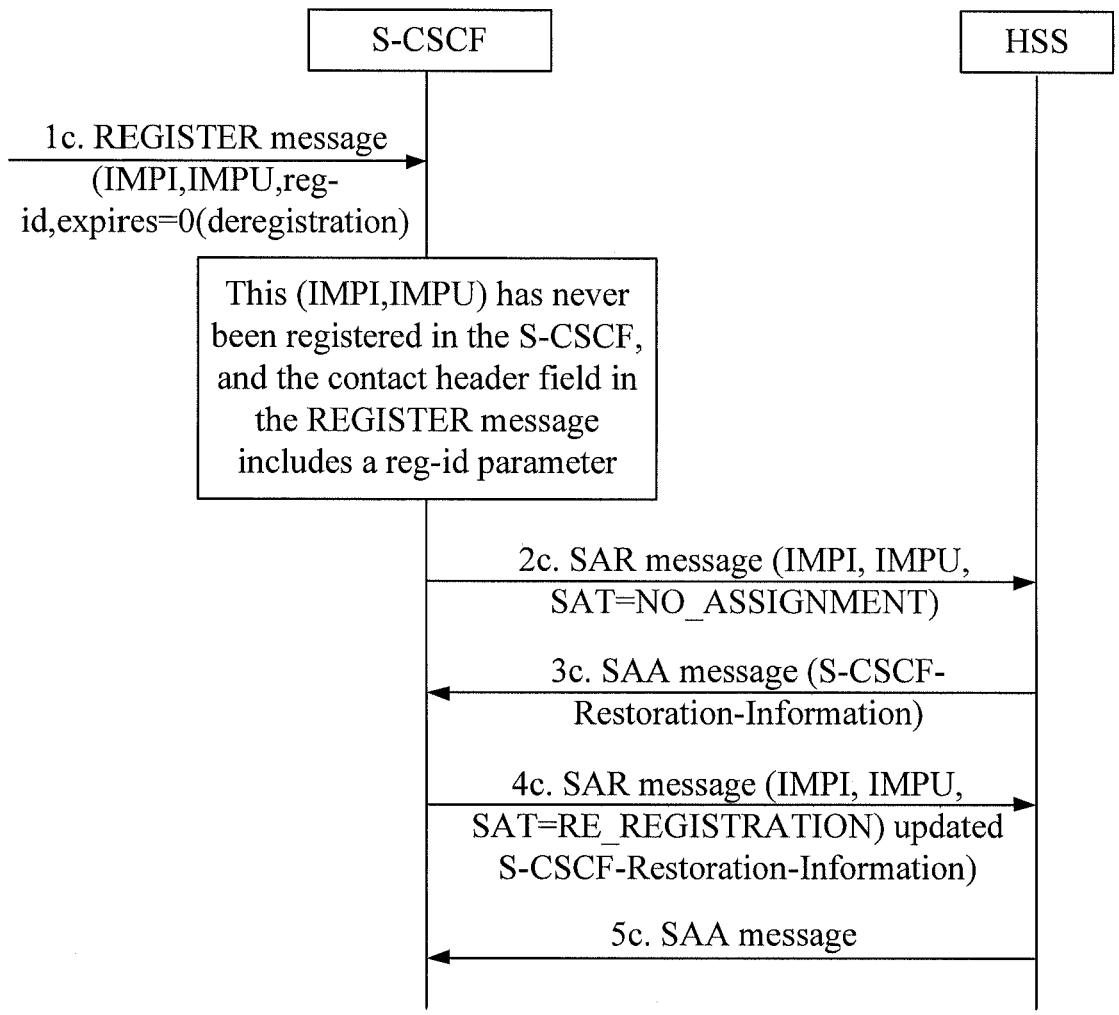
FIG. 5 is a signaling diagram of a method for processing registration backup data in a fifth embodiment of the present invention.

FIG. 5 is a signaling diagram of a method for processing registration backup data in the fifth embodiment of the present invention. As shown in FIG. 5, the procedure for backing up and/or recovering the registration information in the deregistration process of the UE includes the following steps:

Step 1c: The S-CSCF receives a deregistration message "REGISTER" from the UE, and the message carries the (IMPU, IMPI) to be deregistered. The contact header field includes a contact address and further includes at least "reg-id" information.

Step 2c: The S-CSCF finds that the (IMPI, IMPU) has never been registered in the S-CSCF before, namely, no relevant (IMPI, IMPU) registration information exists. According to the "reg-id" in the contact header field in the REGISTER message, the S-CSCF determines that the UE supports multi-registration, and that only one contact address in the multi-registration and the relevant information need to be deregistered. Therefore, the S-CSCF sends an SAR (SAT=NO_ASSIGNMENT) message to the HSS to request the registration backup data.

Step 3c: The HSS returns an SAA message that carries the requested registration backup data to the S-CSCF.

Step 4c: The S-CSCF updates the registration backup data according to the registration backup data carried in the received SAA message, and then sends an SAR (SAT=RE_REGISTRATION) message that carries the updated registration backup data to the HSS to update the user registration backup data in the HSS.

Step 5c: The HSS returns an SAA message to the S-CSCF.

In the method for processing registration backup data in this embodiment, the S-CSCF receives a deregistration message from the UE and determines that the UE supports multi-registration and that the deregistration message intends to deregister only one contact address in the multi-registration according to the "reg-id" in the contact header field in the REGISTER message; the S-CSCF sends an SAR (SAT=NO_ASSIGNMENT) message to the HSS to request the registration backup data; the S-CSCF updates the registration backup data according to the registration backup data carried in the received SAA message, and then sends an SAR (SAT=RE_REGISTRATION) message that carries the updated user registration backup data to the HSS to update the user registration backup data in the HSS; if the S-CSCF determines that the "reg-id" isn't included in the contact header field in the REGISTER message, the S-CSCF sends a deregistration request SAR (SAT=USER_DEREGISTRATION) directly to clear the relevant registration backup data corresponding to the user identity (IMPU, IMPI) in the HSS.

In the embodiments above, to support backup of multi-registration information, the S-CSCF may combine multiple contact addresses registered by the UE, the corresponding path and "Subscription Info" into the "Contact", "Path" and "Subscription-Info AVP" of the S-CSCF-Restoration-Info respectively, and back up the contact addresses to the HSS. Alternatively, the "S-CSCF-Restoration-Info" is extended in the following way:

---

S-CSCF-Restoration-Info ::= < AVP Header: 639, 10415>
{ User-Name }
*{ Restoration-Info}
*[ AVP ]

---

The structure of the Restoration-Info is as follows:

---

Restoration-Info ::= < AVP Header: xxx, 10415>
{ Path }
{ Contact }
[ Subscription-Info ]
*[ AVP ]

---

Each Restoration-Info corresponds to a group of registration information registered by the UE.

The method for processing registration backup data in this embodiment avoids an unnecessary second SAR/SAA signaling interaction, reduces the signaling load, avoids unnecessary data processing between the HSS and the S-CSCF, and saves network resources.

Figure 6:
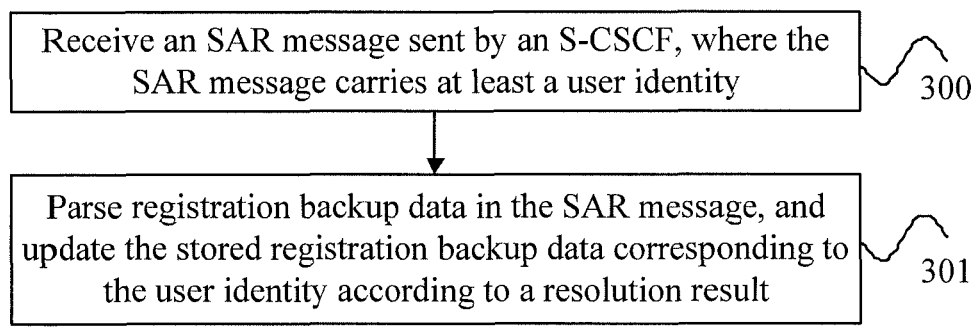
FIG. 6 is a flowchart of a method for processing registration backup data in a sixth embodiment of the present invention.

FIG. 6 is a flowchart of a method for processing registration backup data in the sixth embodiment of the present invention. As shown in FIG. 6, the method includes the following steps:

Step 300: Receive an SAR message sent by an S-CSCF, where the SAR message carries at least a user identity.

After receiving the registration request message from the UE, the S-CSCF sends the content of the request message to the HSS directly through an SAR message; or, if the request message carries multi-registration information, namely, a "reg-id" parameter, the S-CSCF adds an AVP in the SAR message and sends the message to the HSS, where the value of the information carried in the AVP is the same as the value of the "reg-id".

Step 301: Parse the registration backup data in the SAR message, and update the stored registration backup data corresponding to the user identity according to a resolution result.

After receiving the SAR message in the initial registration process, the HSS parses the registration backup data carried in the SAR message, and judges whether the registration is multi-registration or the initial registration of multi-registration. Optionally, such registration backup data does not replace the previously stored registration backup data only if the HSS determines that data recovery is required for the S-CSCF, for example, only if the number of contact addresses stored in the HSS is greater than the number of contact addresses carried in the SAR message sent by the S-CSCF. In this case, the HSS returns an SAA message that carries the registration backup data previously stored in the HSS, and returns an error indication or another indication which instructs the S-CSCF to back up the data again. Alternatively, the HSS may update the stored registration backup data according to the registration backup data in the SAR message, and send an SAA message to the S-CSCF, where the SAA message carries the updated registration backup data and a success indication. Afterward, the S-CSCF does not need to send an SAR message carrying registration backup information again.

The S-CSCF extends "S-CSCF-Restoration-Info" by adding an AVP into it. The value of the information carried in the AVP is the same as the value of "reg-id" in the registration message. After receiving "S-CSCF-Restoration-Info" carried in the SAR message, the HSS parses the "reg-id" information in the message and compares the "reg-id" with the "reg-id" in the previously stored registration backup data. If the "reg-id" is the same as the "reg-id" in the previously stored registration backup data, the HSS uses the registration information corresponding to the "reg-id" in the SAR message to replace that previously stored in the HSS; if the "reg-id" is different from the "reg-id" in the previously stored registration backup data, the HSS adds the registration information corresponding to the newly added "reg-id" in the SAR message into the registration backup data stored in the HSS. If the updated registration backup data in the HSS is different from the registration backup data carried in the SAR, the HSS sends an SAA message to the S-CSCF, where the SAA message carries the updated registration backup data and a success indication. Subsequently, the S-CSCF does not need to send an SAR message carrying registration backup information again.

In the method for processing registration backup data in this embodiment, the HSS parses the SAR message, and updates the stored registration backup data directly according to the resolution result, therefore avoiding an unnecessary second SAR/SAA signaling interaction between the S-CSCF and the HSS, completing the data processing through only one signaling interaction, and saving network resources.

Figure 7:
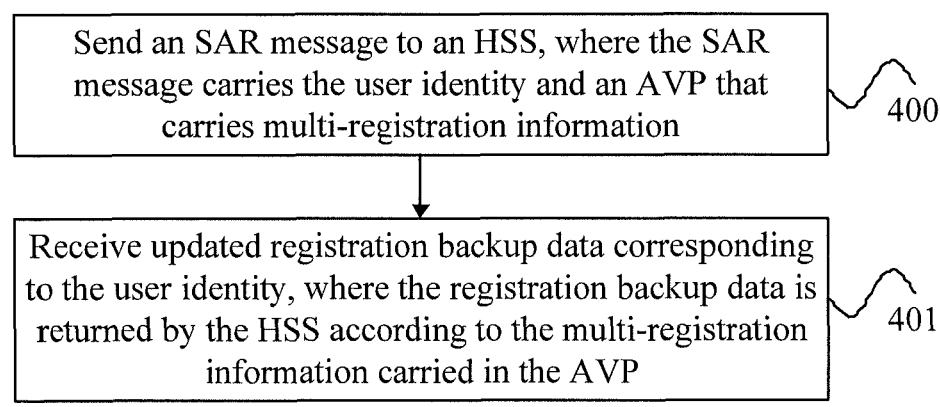
FIG. 7 is a flowchart of a method for processing registration backup data in a seventh embodiment of the present invention.

FIG. 7 is a flowchart of a method for processing registration backup data in the seventh embodiment of the present invention. As shown in FIG. 7, the method includes the following steps:

Step 400: Send an SAR message to an HSS, where the SAR message carries the user identity and an AVP that carries multi-registration information.

After receiving the registration request message from the UE, the S-CSCF parses the multi-registration information "reg-id" in the request message; and extends "S-CSCF-Restoration-Info" by adding an AVP into it. The value of the information carried in the AVP is the same as the value of "reg-id" in the registration message.

Step 401: Receive updated registration backup data corresponding to the user identity, where the registration backup data is returned by the HSS according to the multi-registration information carried in the AVP.

After receiving the "S-CSCF-Restoration-Info" carried in the SAR message, the HSS parses the "reg-id" information in the message and compares the "reg-id" information with the "reg-id" in the previously stored registration backup data. If the "reg-id" is the same as the "reg-id" in the previously stored registration backup data, the HSS uses the registration information corresponding to the "reg-id" in the SAR message to replace that previously stored in the HSS; if the "reg-id" is different from the "reg-id" in the previously stored registration backup data, the HSS adds the registration information corresponding to the newly added "reg-id" in the SAR message into the registration backup data stored in the HSS. If the updated registration backup data in the HSS is different from the registration backup data carried in the SAR, the HSS sends an SAA message to the S-CSCF, where the SAA message carries the updated registration backup data and a success indication. Subsequently, the S-CSCF does not need to send an SAR message carrying registration backup information again.

In the method for processing registration backup data in this embodiment, the AVP sent by the S-CSCF carries a parameter "reg-id", and the HSS can identify the "reg-id" information conveniently and update the registration backup data according to the information, therefore avoiding an unnecessary second SAR/SAA signaling interaction between the S-CSCF and the HSS, completing the data processing through only one signaling interaction, and saving network resources.

Persons of ordinary skill in the art should understand that all or part of the steps of the method according to the embodiments of the present invention may be implemented by a program instructing relevant hardware. The program may be stored in a computer readable storage medium. When the program runs, the steps of the method according to the embodiments of the present invention are performed. The storage medium may be any medium that is capable of storing program codes, such as a Read Only Memory (ROM), a Random Access Memory (RAM), a magnetic disk, or a Compact Disk-Read Only Memory (CD-ROM).

Figure 8:
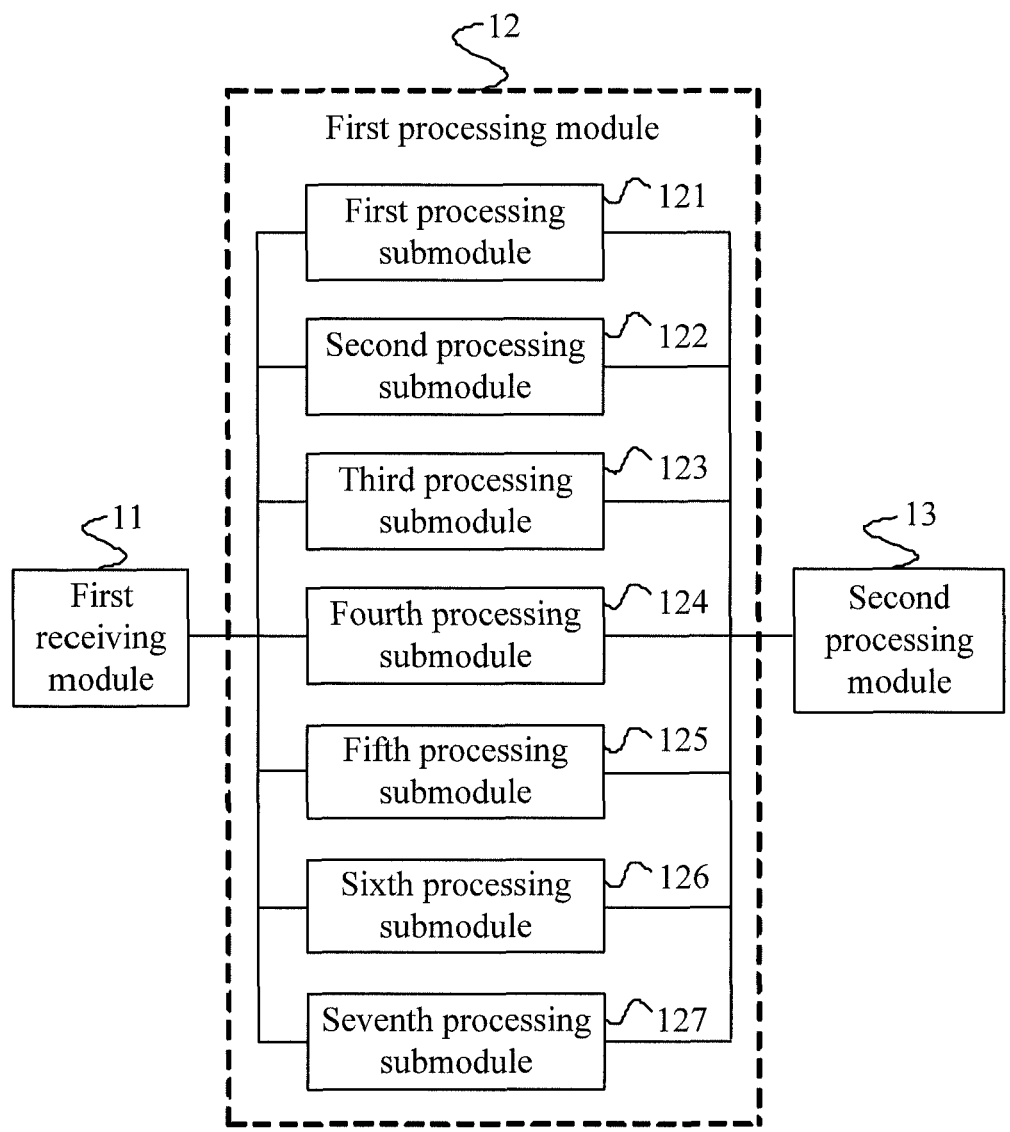
FIG. 8 shows a structure of an S-CSCF in the first embodiment of the present invention.

FIG. 8 shows a structure of an S-CSCF provided in the first embodiment of the present invention. As shown in FIG. 8, the S-CSCF includes a first receiving module 11 and a first processing module 12. The first receiving module 11 is configured to receive a registration request message that carries at least a user identity from a UE. The first processing module 12 is configured to send an SAR message to an HSS according to whether the registration request message carries multi-registration information, where the SAR message carries the user identity and indication information which instructs the HSS to process stored registration backup data corresponding to the user identity.

When the UE requests the network to perform a certain operation such as deregistration or initial registration, the UE sends a registration request message such as a REGISTER message to the network. The first receiving module 11 in the S-CSCF receives the REGISTER message, which carries the user identity (IMPI, IMPU) of the UE. After receiving the REGISTER message sent by the UE, the first receiving module 11 judges whether the message carries multi-registration information (namely, a "reg-id" parameter), and therefore, knows whether the message is an ordinary initial registration request or an initial registration request in multi-registration. The first processing module 12 sends an SAR message to the HSS according to whether the message carries a "reg-id" parameter. The SAR message carries the registered identity information (IMPI, IMPU) of the UE and the indication information which instructs the HSS to process the stored registration backup data corresponding to the (IMPI, IMPU). The first processing module 12 determines the SAR message sent to the HSS according to whether the "reg-id" parameter is carried in the registration request message, which may be processed by any one or combination of the following submodules: a first processing submodule 121, a second processing submodule 122, a third processing submodule 123, a fourth processing submodule 124, a fifth processing submodule 125, a sixth processing submodule 126, and a seventh processing submodule 127:

The first processing submodule 121 is configured to send a first SAR message to the HSS if the registration request message carries multi-registration information, where the first SAR message carries the user identity (IMPI, IMPU) and indication information, and the indication information includes server assignment type information indicating that the first SAR message is a request for initial registration of the user identity and includes multi-registration indication information. The first processing submodule is further configured to send a first SAR message to the HSS if the registration request message carries a "reg-id" parameter and it is determined that the S-CSCF stores no registration information corresponding to the user identity.

The second processing submodule 122 is configured to send a second SAR message to the HSS if the registration request message carries multi-registration information (namely, "reg-id") and it is determined that the S-CSCF stores the registration information corresponding to the user identity (IMPI, IMPU), where the second SAR message carries the user identity and the indication information, and the indication information includes server assignment type information indicating that the second SAR message is a request for initial registration of the user identity.

The third processing submodule 123 is configured to send a third SAR message to the HSS if the registration request message carries no multi-registration information, where the third SAR message carries the user identity (IMPI, IMPU) and indication information, and the indication information includes server assignment type information indicating that the third SAR message is a request for initial registration of the user identity.

The fourth processing submodule 124 is configured to use the registration information in the registration request message to update the stored registration information and send the updated registration backup data to the HSS if the registration request message carries multi-registration information (namely, "reg-id") and deregistration information, if it is determined that the S-CSCF stores the registration information corresponding to the user identity (IMPI, IMPU), and if it is determined that the registration information in the registration request message is different from the stored registration information.

The fifth processing submodule 125 is configured to send a fourth SAR message to the HSS if the registration request message carries multi-registration information (namely, "reg-id") and deregistration information, if it is determined that the S-CSCF stores the registration information corresponding to the user identity (IMPI, IMPU) and if it is determined that the registration information in the registration request message is the same as the stored registration information, where the fourth SAR message carries the user identity and indication information, and the indication information includes server assignment type information which instructs the HSS to deregister the user identity.

The sixth processing submodule 126 is configured to send a fifth SAR message to the HSS if the registration request message carries deregistration information but carries no multi-registration information (namely, "reg-id"), where the fifth SAR message carries the user identity (IMPI, IMPU) and indication information, and the indication information includes server assignment type information which instructs the HSS to deregister the user identity.

The seventh processing submodule 127 is configured to send a sixth SAR message to the HSS if the registration request message carries deregistration information and multi-registration information (namely, "reg-id") and it is determined that the S-CSCF stores no registration information corresponding to the user identity (IMPI, IMPU), where the sixth SAR message carries the user identity and indication information, and the indication information includes server assignment type information which requests the registration backup data corresponding to the user identity from the HSS.

The S-CSCF further includes a second processing module 13. The second processing module 13 is configured to receive an SAA message that carries the registration backup data corresponding to the user identity from the HSS, use the registration information in the registration request message of the UE to update the registration backup data returned by the HSS, and send the updated registration backup data to the HSS.

In this embodiment, the S-CSCF judges whether the request message sent by the UE carries the multi-registration information ("reg-id"), and decides the type of SAR message to be sent to the HSS, therefore avoiding an unnecessary second SAR/SAA signaling interaction, reducing the signaling load, avoiding unnecessary data processing between the HSS and the S-CSCF, and saving network resources.

Figure 9:
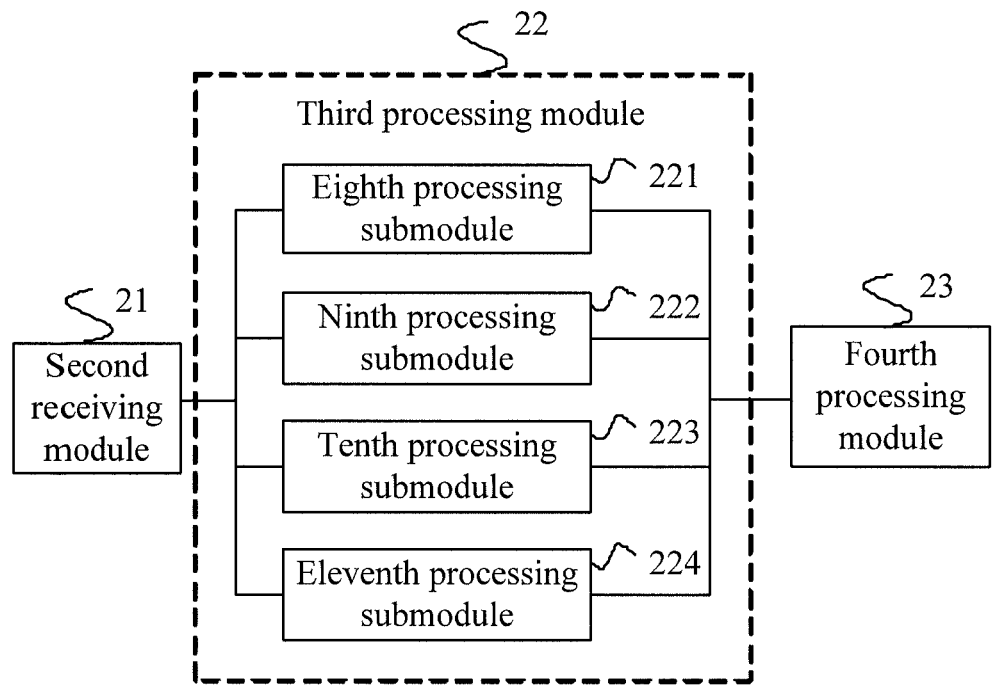
FIG. 9 shows a first structure of an HSS in an embodiment of the present invention.

FIG. 9 shows a first structure of an HSS in an embodiment of the present invention. As shown in FIG. 9, the HSS includes a second receiving module 21 and a third processing module 22. The second receiving module 21 is configured to receive an SAR message that carries a user identity and indication information from the S-CSCF; and the third processing module 22 is configured to process stored registration backup data corresponding to the user identity according to whether the indication information includes multi-registration indication information.

Specifically, when the UE requests the network to perform a certain operation such as deregistration or initial registration, the S-CSCF receives a REGISTER message from the UE, and the message should carry the user identity (IMPI, IMPU) of the UE. First, the S-CSCF judges whether the message carries multi-registration information (namely, a "reg-id" parameter), and sends an SAR message to the HSS according to the judgment result. The SAR message carries the identity information (IMPI, IMPU) registered by the UE and indication information which instructs the HSS to process the stored registration backup data corresponding to the (IMPI, IMPU). The second receiving module 21 in the HSS receives the SAR message sent by the S-CSCF, and the third processing module 22 processes the stored registration backup data corresponding to the user identity according to whether the SAR message carries multi-registration indication information.

If the S-CSCF determines that the REGISTER message carries a "reg-id" parameter, the S-CSCF adds multi-registration indication information into the SAR message; or, if the S-CSCF determines that the REGISTER message carries a "reg-id" parameter and that the S-CSCF itself stores no registration information corresponding to the user identity (IMPI, IMPU), the S-CSCF adds multi-registration indication information into the SAR message. If the REGISTER message carries a "reg-id" parameter but the S-CSCF determines that the S-CSCF itself stores the registration information corresponding to the user identity (IMPI, IMPU), the S-CSCF adds no multi-registration indication information into the SAR message. If the S-CSCF determines that the REGISTER message carries no "reg-id" parameter, the S-CSCF adds no multi-registration indication information into the SAR message. If the S-CSCF determines that the REGISTER message carries not only the "reg-id" parameter, but also deregistration information such as a parameter "expires=0", and determines that the S-CSCF itself stores the registration information corresponding to the user identity (IMPI, IMPU), the S-CSCF sends an SAR message to the HSS directly. The SAR message instructs the HSS to perform deregistration, but carries no multi-registration indication information. If the S-CSCF determines that the REGISTER message carries not only the "reg-id" parameter, but also deregistration information such as a parameter "expires=0", and determines that the S-CSCF itself stores no registration information corresponding to the user identity (IMPI, IMPU), the S-CSCF sends an SAR message which instructs the HSS to return the stored registration backup data of the UE and the SAR message carries no multi-registration indication information. If the S-CSCF determines that the REGISTER message carries deregistration information such as a parameter "expires=0" but carries no "reg-id" parameter, the S-CSCF sends an SAR message which instructs the HSS to perform deregistration, and the SAR message carries no multi-registration indication information.

Specific to various conditions above, the third processing module 22 works through any one or combination of its submodules: an eighth processing submodule 221, a ninth processing submodule 222, a tenth processing submodule 223, and an eleventh processing submodule 234.

The eighth processing submodule 221 is configured to return an SAA message that carries the stored registration backup data corresponding to the user identity to the S-CSCF if the indication information includes server assignment type information indicating that the SAR message is a request for performing initial registration of the user identity and includes multi-registration indication information.

The ninth processing submodule 222 is configured to use the registration information in the SAR message to update the stored registration backup data corresponding to the user identity if the indication information includes the server assignment type information indicating that the SAR message is a request for performing initial registration of the user identity.

The tenth processing submodule 223 is configured to delete the stored registration backup data if the indication information includes the server assignment type information which is an instruction of deregistering the user identity.

The eleventh processing submodule 234 is configured to return an SAA message that carries the stored registration backup data corresponding to the user identity to the S-CSCF if the indication information includes the server assignment type information which requests the registration backup data corresponding to the user identity.

The HSS further includes a fourth processing module 23, which is configured to receive and store the registration backup data that is updated by the S-CSCF by using the registration information in the SAR message.

In this embodiment, the HSS judges whether the SAR message sent by the S-CSCF carries the multi-registration indication information, and performs the corresponding operations, therefore avoiding an unnecessary second SAR/SAA signaling interaction, reducing the signaling load, avoiding unnecessary data processing between the HSS and the S-CSCF, and saving network resources.

Figure 10:
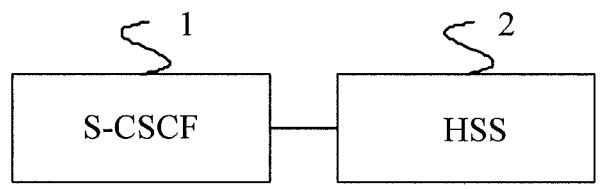
FIG. 10 shows a structure of a system for processing registration backup data in the first embodiment of the present invention.

FIG. 10 shows a structure of a system for processing registration backup data in the first embodiment of the present invention. As shown in FIG. 10, the system includes an S-CSCF1 and an HSS2. The S-CSCF1 is configured to receive a registration request message from a UE, where the registration request message carries at least a user identity; and send a corresponding SAR message to the HSS2 according to whether the registration request message carries multi-registration information, where the SAR message carries the user identity and indication information which instructs the HSS2 to process the stored registration backup data corresponding to the user identity.

The HSS2 is configured to receive the SAR message sent by the S-CSCF1, where the SAR message carries the user identity and indication information; and process the stored registration backup data corresponding to the user identity according to whether the indication information includes multi-registration indication information.

The S-CSCF1 and the HSS2 in this embodiment may be the S-CSCF and the HSS provided in the foregoing embodiments respectively, and are not described further.

In the system for processing registration backup data in this embodiment, the S-CSCF judges whether the request message sent by the UE carries the multi-registration information ("reg-id"), and decides the type of SAR message to be sent to the HSS; the HSS judges whether the SAR message sent by the S-CSCF carries multi-registration indication information and performs the corresponding operations, therefore avoiding an unnecessary second SAR/SAA signaling interaction, reducing the signaling load, avoiding unnecessary data processing between the HSS and the S-CSCF, and saving network resources.

Figure 11:
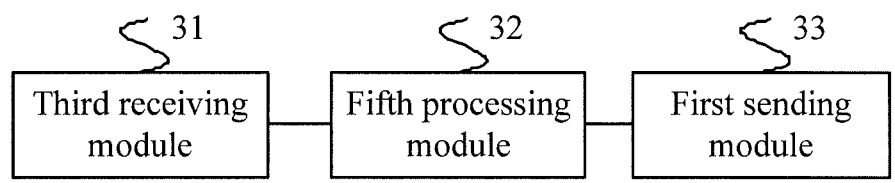
FIG. 11 shows a second structure of an HSS in an embodiment of the present invention.

FIG. 11 shows a second structure of an HSS in an embodiment of the present invention. As shown in FIG. 11, the HSS includes a third receiving module 31 and a fifth processing module 32. The third receiving module 31 is configured to receive an SAR message that carries at least a user identity from the S-CSCF; and the fifth processing module 32 is configured to parse the registration backup data in the SAR message, and update stored registration backup data corresponding to the user identity according to a resolution result.

Specifically, after receiving the registration request message from the UE, the S-CSCF sends the content of the request message to the HSS directly through an SAR message; or, if the request message carries multi-registration information, namely, a "reg-id" parameter, the S-CSCF adds an AVP in the SAR message and sends the message to the HSS, where the value of the information carried in the AVP is the same as the value of the "reg-id". After the third receiving module 31 in the HSS receives the SAR message, the fifth processing module 32 parses the SAR message, and judges whether the registration is multi-registration or the initial registration of multi-registration. Optionally, such registration backup data does not replace the previously stored registration backup data only if it is determined that data recovery is required for the S-CSCF, for example, only if the number of contact addresses stored in the HSS is greater than the number of contact addresses carried in the SAR message sent by the S-CSCF. In this case, the HSS returns an SAA message that carries the registration backup data previously stored in the HSS, and returns an error indication or another indication which instructs the S-CSCF to back up the data again. Alternatively, the HSS may update the stored registration backup data according to the registration backup data in the SAR message, and send an SAA message to the S-CSCF, where the SAA message carries the updated registration backup data and a success indication. In this way, the S-CSCF does not need to send an SAR message carrying registration backup information again.

The S-CSCF extends "S-CSCF-Restoration-Info" by adding an AVP into it. The value of the information carried in the AVP is the same as the value of "reg-id" in the registration message. After the third receiving module 31 receives the "S-CSCF-Restoration-Info" carried in the SAR message, the fifth processing module 32 parses the "reg-id" information in the message and compares the "reg-id" information with the "reg-id" in the previously stored registration backup data. If the "reg-id" is the same, the HSS uses the registration information corresponding to the "reg-id" in the SAR message to replace that previously stored in the HSS; if the "reg-id" is different, the HSS adds the registration information corresponding to the newly added "reg-id" in the SAR message into the registration backup data stored in the HSS. If the updated registration backup data in the HSS is different from the registration backup data carried in the SAR, the HSS sends an SAA message to the S-CSCF, where the SAA message carries the updated registration backup data and a success indication. Subsequently, the S-CSCF does not need to send an SAR message carrying registration backup information again. Through the HSS provided in this embodiment, the first sending module 33 sends the updated registration backup data to the S-CSCF.

In this embodiment, the HSS parses the SAR message, and updates the stored registration backup data directly according to the resolution result, therefore avoiding an unnecessary second SAR/SAA signaling interaction between the S-CSCF and the HSS, completing the data processing through only one signaling interaction, and saving network resources.

Figure 12:
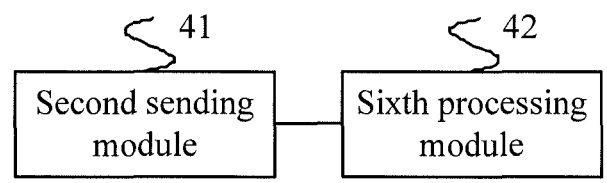
FIG. 12 shows a structure of an S-CSCF in the second embodiment of the present invention.

FIG. 12 shows a structure of an S-CSCF provided in the second embodiment of the present invention. As shown in FIG. 12, the S-CSCF includes a second sending module 41 and a sixth processing module 42. The second sending module 41 is configured to send an SAR message to the HSS, where the SAR message carries a user identity and an AVP which includes multi-registration information. The sixth processing module 42 is configured to receive the updated registration backup data corresponding to the user identity, where the registration backup data is returned by the HSS according to the multi-registration information carried in the AVP.

Specifically, the S-CSCF receives the request message from the UE, parses the multi-registration information "reg-id" in the request message, and extends the "S-CSCF-Restoration-Info" by adding an AVP into it, where the value of the information carried in the AVP is the same as the value of "reg-id" in the registration message; and the second sending module 41 sends the extended information to the HSS. The HSS uses the registration information to update the registration backup data stored in the HSS according to the "reg-id" carried in the AVP, and returns the updated registration backup data to the S-CSCF; and the sixth processing module 42 in the S-CSCF receives the updated registration backup data.

In this embodiment, the AVP sent by the S-CSCF carries a parameter "reg-id", and the HSS can identify the "reg-id" information conveniently and update the registration backup data according to the information, therefore avoiding an unnecessary second SAR/SAA signaling interaction between the S-CSCF and the HSS, completing the data processing through only one signaling interaction, and saving network resources.

Figure 13:
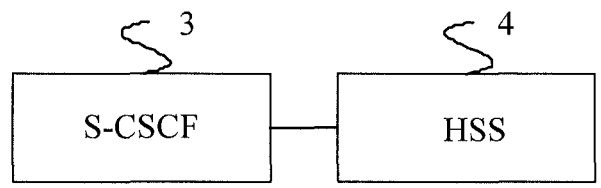
FIG. 13 shows a structure of a system for processing registration backup data in the second embodiment of the present invention.

FIG. 13 shows a structure of a system for processing registration backup data in the second embodiment of the present invention. As shown in FIG. 13, the system includes an S-CSCF3 and an HSS4. The S-CSCF3 is configured to send an SAR message that carries a user identity to the HSS4, and receive updated registration backup data corresponding to the user identity from the HSS4 after the HSS4 parses the SAR message. The HSS4 is configured to receive an SAR message sent by the S-CSCF3 and parse the SAR message; and update the stored registration backup data corresponding to the user identity according to the resolution result. The S-CSCF3 in the system sends an SAR message to the HSS4, where the SAR message carries a user identity and an AVP which includes multi-registration information.

In the system for processing registration backup data in this embodiment, the HSS parses the SAR message sent by the S-CSCF, and uses the registration information in the parsed message to update the registration backup data of the UE, therefore avoiding an unnecessary second SAR/SAA signaling interaction, reducing the signaling load, avoiding unnecessary data processing between the HSS and the S-CSCF, and saving the network resources.

Finally, it should be noted that the above embodiments are merely provided for describing the technical solution of the present invention, but not intended to limit the present invention. It is apparent that persons skilled in the art can make various modifications and variations to the invention without departing from the spirit and scope of the invention. The present invention is intended to cover the modifications and variations provided that they fall within the scope of protection defined by the following claims or their equivalents.

What is claimed is:

1. In a node of an Internet Protocol Multimedia Subsystem (IMS) network, the node configured with a Serving Call Session Control Function (S-CSCF) and supporting restoration procedures, a method for obtaining at least a portion of the user's registration backup data from a Home Subscriber Server (HSS) of the IMS network, without overwriting at least a portion user's multi-registration backup data commonly used by multiple access technologies stored in the HSS, when a subsequent registration occurs for the user and when the node lacks registration data, the method comprising:

receiving, from a User Equipment (UE), a Session Initiation Protocol (SIP) registration request message that carries at least an IMS Private User Identity (IMPI) and IMS Public User Identity (IMPU) pair;

in response to receiving the SIP registration request message, determining: a) a lack of registration data corresponding to the IMPI and IMPU pair stored by the node; and b) that the SIP registration request message includes a reg-id parameter, which indicates that the SIP registration request message relates to a multi-registration associated with the IMPI and IMPU pair;

sending a Server Assignment Request (SAR) message to the HSS, wherein the SAR message carries the IMPI and IMPU pair, a parameter for identifying that the SAR message relates to an initial registration of the user, and a multiple registration indication, which indicates that the SAR message relates to a multi-registration associated with the IMPI and IMPU pair; and receiving a Server Assignment Answer (SAA) message carrying registration backup data corresponding to the IMPI and IMPU pair from the HSS.

2. The method according to claim 1, further comprising:
using registration data carried in the SIP registration request message to update the registration backup data received from the HSS; and sending another SAR message carrying the updated registration backup data to the HSS.

3. A node configured with a Serving Call Session Control Function (S-CSCF) in an Internet Protocol Multimedia Subsystem (IMS) network, wherein the node is configured to obtain at least a portion of a user's registration backup data stored in a Home Subscriber Server (HSS) of the IMS network when a subsequent registration occurs for the user and when the node lacks registration data of the user, comprising:

a first receiving module, configured to receive a Session Initiation Protocol (SIP) registration request message that carries at least an IMS Private User Identity (IMPI) and IMS Public User Identity (IMPU) pair during a registration of the user; and a processing module, configured to:

in response to receiving the SIP registration request message, determine: a) a lack of registration data corresponding to the IMPI and IMPU pair stored by the node; and b) that the SIP registration request message comprises a reg-id parameter which indicates that the registration relates to a multi-registration associated with the IMPI and IMPU pair;

send a Server Assignment Request (SAR) message to the HSS, wherein the SAR message carries the IMPI and IMPU pair, a parameter for identifying that the registration relates to an initial registration, and a multiple registration indication which indicates that the registration relates to a multi-registration associated with the IMPI and IMPU pair; and receive a Server Assignment Answer (SAA) message carrying registration backup data corresponding to the IMPI and IMPU pair from the HSS.

4. The S-CSCF according to claim 3, wherein the processing module is further configured to:

use registration data carried in the SIP registration request message to update the registration backup data received from the HSS; and send another SAR message carrying the updated registration backup data to the HSS.

5. A node configured with a Home Subscriber Server (HSS) in an Internet Protocol Multimedia Subsystem (IMS) network, wherein the node is configured to send at least a portion of a user's registration backup data stored by the node to a Serving Call Session Control Function (S-CSCF) in the IMS network without overwriting the at least a portion of the user's registration backup data stored by the node, when a subsequent registration occurs for the user, comprising:

a receiving module, configured to receive a Server Assignment Request (SAR) message sent by the S-CSCF during a registration of the user, wherein the SAR message carries an IMS Private User Identity (IMPI) and IMS Public User Identity (IMPU) pair, a parameter for identifying that the registration relates to an initial registration, and a multiple registration indication which indicates that the registration relates to a multi-registration associated with the IMPI and IMPU pair; and a processing module, configured to:

determine: a) that the multiple registration indication is included in the SAR message; and b) that the IMPI and IMPU pair is stored as registered in the HSS and registration backup data related to the IMPI and IMPU pair is stored in the HSS; and send a Server Assignment Answer (SAA) message carrying the registration backup data related to the IMPI and IMPU pair to the S-CSCF.

6. The method according to claim 1, wherein the parameter is a Server-Assignment-Type parameter which is set to "REGISTRATION".

7. The method according to claim 2, wherein the another SAR message carries a Server-Assignment-Type parameter set to "RE_REGISTRATION".

8. The S-CSCF according to claim 3, wherein the parameter is a Server-Assignment-Type parameter which is set to "REGISTRATION".

9. The S-CSCF according to claim 4, wherein the another SAR message carries a Server-Assignment-Type parameter set to "RE_REGISTRATION".

10. The HSS according to claim 5, wherein the parameter is a Server-Assignment-Type parameter which is set to "REGISTRATION".

11. The HSS according to claim 5, wherein the receiving module is further configured to receive from the S-CSCF another SAR message carrying a Server-Assignment-Type parameter set to "RE_REGISTRATION", updated registration backup data which is obtained by the S-CSCF by using registration data carried in a Session Initiation Protocol (SIP) registration request message to update the registration backup data related to the IMPI and IMPU pair sent by the HSS, wherein the processing module is further configured to overwrite the registration backup data stored in the HSS with the updated registration backup data.

12. A non-transitory computer program product for use in an IP Multimedia Subsystem (IMS) network node configured with a Serving Call Session Control Function (S-CSCF), wherein the computer program product is configured to cause the S-CSCF to request at least a portion user's registration backup data from a Home Subscriber Server (HSS) in the IMS network, wherein the computer program further comprises computer executable instructions stored in hardware, on one or more computer readable media, or a combination thereof, such that when a processor associated with the S-CSCF executes the computer instructions it causes the S-CSCF to:

receive from a User Equipment (UE), a Session Initiation Protocol (SIP) registration request message that carries an IMS Private User Identity (IMPI) and IMS Public User Identity (IMPU) pair during a registration;

in response to receiving the SIP registration request message, determine: a) a lack of registration data corresponding to the IMPI and IMPU pair stored by the node; and b) that the SIP registration request message comprises a reg-id parameter which indicates that the registration relates to a multi-registration associated with the IMPI and IMPU pair;

send a Server Assignment Request (SAR) message to the HSS, wherein the SAR message carries the IMPI and IMPU pair, a parameter for identifying that the registration relates to an initial registration, and a multiple registration indication which indicates that the registration relates to a multi-registration associated with the IMPI and IMPU pair; and receive a Server Assignment Answer (SAA) message carrying registration backup data corresponding to the IMPI and the IMPU pair from the HSS.

13. The computer program product according to claim 12, wherein the S-CSCF further updates the registration backup data received from the HSS by using registration data carried in the SIP registration request message; and sends another SAR message carrying the updated registration backup data to the HSS.

14. The computer program product according to claim 12, wherein the parameter is a Server-Assignment-Type parameter which is set to "REGISTRATION".

15. A non-transitory computer program product for use in an IP Multimedia Subsystem (IMS) network node configured with a Home Subscriber Server (HSS), wherein the computer program product is configured to cause the HSS to send at least a portion of a user's registration backup data stored by the node to a Serving Call Session Control Function (S-CSCF) in the IMS network, wherein the computer program further comprises computer executable instructions stored in hardware, on one or more computer readable media, or a combination thereof, such that when a processor associated with the HSS executes the computer instructions it causes the HSS to:

receive a Server Assignment Request (SAR) message sent from the S-CSCF during a registration, wherein the SAR message carries an IMS Private User Identity (IMPI) and IMS Public User Identity (IMPU) pair, a parameter for identifying that the registration relates to an initial registration, and a multiple registration indication indicating that the registration is related to a multiple registration associated with the IMPI and IMPU pair;

determine: a) that the multiple registration indication is included in the SAR message; and b) that the IMPI and IMPU pair is stored as registered in the HSS and registration backup data related to the IMPI and IMPU pair is stored in the HSS; and send a Server Assignment Answer (SAA) carrying the registration backup data related to the IMPI and IMPU pair to the S-CSCF.

16. The computer program product according to claim 15, wherein the HSS further receives from the S-CSCF another SAR message carrying a Server-Assignment-Type parameter set to "RE_REGISTRATION", updated registration backup data which is obtained by the S-CSCF by using registration data carried in a Session Initiation Protocol (SIP) registration request message to update the registration backup data sent from the HSS; and overwrites the registration backup data stored in the HSS with the updated registration backup data.

17. The computer program product according to claim 15, wherein the parameter is a Server-Assignment-Type parameter which is set to "REGISTRATION".

* * * * *